(12) United States Patent
Chida et al.

(10) Patent No.: US 10,732,192 B2
(45) Date of Patent: Aug. 4, 2020

(54) AUTOMATIC ANALYZER

(71) Applicant: HITACHI HIGH-TECHNOLOGIES CORPORATION, Tokyo (JP)

(72) Inventors: Satoru Chida, Tokyo (JP); Kazuhiro Nakamura, Tokyo (JP); Yoshihiro Suzuki, Tokyo (JP); Toshihide Orihashi, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 559 days.

(21) Appl. No.: 15/319,914

(22) PCT Filed: May 22, 2015

(86) PCT No.: PCT/JP2015/064812
§ 371 (c)(1),
(2) Date: Dec. 19, 2016

(87) PCT Pub. No.: WO2015/198764
PCT Pub. Date: Dec. 30, 2015

(65) Prior Publication Data
US 2017/0153261 A1 Jun. 1, 2017

(30) Foreign Application Priority Data

Jun. 26, 2014 (JP) ................................. 2014-131815

(51) Int. Cl.
*G01N 35/04* (2006.01)
*G01N 35/00* (2006.01)
*B25J 15/00* (2006.01)

(52) U.S. Cl.
CPC .......... *G01N 35/04* (2013.01); *B25J 15/0038* (2013.01); *G01N 35/0099* (2013.01)

(58) Field of Classification Search
CPC ........ B25J 15/0038; B25J 15/00; B25J 15/02; B25J 15/0253; B25J 15/0408;
(Continued)

(56) References Cited

U.S. PATENT DOCUMENTS 5,070,608 A * 12/1991 Gray .................... B21D 53/085
29/523
5,380,488 A * 1/1995 Wakatake .......... G01N 35/0092
422/63
(Continued)

FOREIGN PATENT DOCUMENTS

EP 2 148 206 A1 1/2010
JP 53-089162 A 8/1978
(Continued)

OTHER PUBLICATIONS

Extended European Search Report received in corresponding European Application No. 15811026.2 dated Feb. 3, 2018.
(Continued)

*Primary Examiner* — John Fitzgerald
*Assistant Examiner* — Truong D Phan
(74) *Attorney, Agent, or Firm* — Mattingly & Malur, PC

(57) ABSTRACT

An automatic analyzer has a transport device which includes a specimen rack gripping mechanism that grips the specimen rack on a first transport path on which the specimen racks are transported by the specimen rack being sandwiched between gripping plates from both sides of flanks in the transport direction to transport the specimen rack along the first transport path and a gripping width controller that controls a distance between the gripping plates of the specimen rack gripping mechanism in accordance with a width of the specimen rack. Accordingly, an automatic analyzer capable of transporting a plurality of types of the specimen racks
(Continued)

while suppressing an increase in size of the apparatus and also an increase in cost can be provided.

14 Claims, 27 Drawing Sheets

(58) Field of Classification Search
CPC ............... G01N 35/0099; G01N 35/04; G01N 2035/0412; G01N 2035/0422; G01N 2035/0424; G01N 2035/0432; G01N 35/026; G01N 35/0029; G01N 35/025; G01N 35/0092; G01N 35/00663
USPC ...................... 73/863.01, 863.92; 422/65, 67
See application file for complete search history.

(56) References Cited

U.S. PATENT DOCUMENTS

| | | | | |
|---|---|---|---|---|
| 8,833,186 | B2* | 9/2014 | Isobe | G01N 35/026 73/863.92 |
| 9,776,811 | B2* | 10/2017 | Itoh | B65G 37/00 |
| 9,952,244 | B2* | 4/2018 | Berberich | G01N 35/02 |
| 2005/0230986 | A1* | 10/2005 | Lindberg | B66C 1/422 294/118 |
| 2009/0162247 | A1 | 6/2009 | Tokieda et al. | |
| 2009/0191095 | A1* | 7/2009 | Nakamura | G01N 35/026 422/67 |
| 2012/0266698 | A1 | 10/2012 | Isobe et al. | |
| 2013/0197690 | A1* | 8/2013 | Suzuki | G01N 35/0092 700/216 |
| 2014/0256050 | A1* | 9/2014 | Tanaka | G01N 35/026 436/47 |
| 2016/0159579 | A1* | 6/2016 | Maldini | B65G 47/24 414/783 |

FOREIGN PATENT DOCUMENTS

| | | |
|---|---|---|
| JP | 62-218392 A | 9/1987 |
| JP | 04-127063 A | 4/1992 |
| JP | 4-266331 A | 9/1992 |
| JP | 09-166600 A | 6/1997 |
| JP | 11-083866 A | 3/1999 |
| JP | 2004-061136 A | 2/2004 |
| JP | 2004-317211 A | 11/2004 |
| JP | 2007-322289 A | 12/2007 |
| JP | 2009-121839 A | 6/2009 |
| JP | 2009-150859 A | 7/2009 |
| JP | 2009-180607 A | 8/2009 |
| WO | 2010/001023 A2 | 1/2010 |
| WO | 2011/040196 A1 | 4/2011 |

OTHER PUBLICATIONS

International Search Report of PCT/JP2015/064812 dated Aug. 11, 2015.
International Preliminary Report on Patentability received in corresponding International Application No. PCT/JP2015/064812 dated Dec. 29, 2016.

* cited by examiner

AUTOMATIC ANALYZER

TECHNICAL FIELD

Embodiments described herein relate generally to an automatic analyzer that conducts a qualitative/quantitative analysis of a biological sample such as blood and urine contained in a specimen container.

BACKGROUND ART

An automatic analyzer is known as an apparatus that automatically conducts a qualitative/quantitative analysis of a biological sample (hereinafter, called a specimen) such as blood and urine and in large hospitals and clinical examination centers where many patients' specimens need to be processed in a short time, various kinds of automatic analyzers, from small to large apparatuses, are used in accordance with necessary processing capabilities.

In such an automatic analyzer, various kinds of processes is performed by using specimen containers containing specimens and particularly in a large automatic analyzer, it is necessary to handle a huge amount of specimen containers and various technologies have been developed to make the analysis more efficient.

For example, PTL 1 (JP 2004-61136 A) discloses a technology to grip a plurality of containers containing specimens simultaneously to shift the containers from rack to rack.

CITATION LIST

Patent Literatures

PTL 1: JP 2004-61136 A

SUMMARY OF INVENTION

Technical Problem

In an automatic analyzer, by the way, one or a plurality of specimen containers may be mounted on a specimen rack and transported and when a plurality of types of specimen racks in different shapes is transported, a transport line is needed for each type (shape) of specimen rack, which poses a problem that the structure and control of the automatic analyzer become more complicated, leading to an increase in size of the apparatus and also an increase in cost.

The present invention is made in view of the above circumstances and an object thereof is to provide an automatic analyzer capable of transferring a plurality of types of specimen racks while suppressing an increase in size of the apparatus and also an increase in cost.

Solution to Problem

To achieve the above object, the present invention is an automatic analyzer having a transport device that transports a specimen rack on which one or more specimen containers containing a specimen to be analyzed are mounted by the specimen containers being equidistantly arranged in a transport direction and an analysis unit that analyzes the specimen contained in the specimen container, wherein the transport device includes a specimen rack gripping mechanism that grips the specimen rack on a first transport path on which the specimen rack is transported by the specimen rack being sandwiched between gripping plates from both sides of flanks in the transport direction to transport the specimen rack along the first transport path and a gripping width controller that controls a distance between the gripping plates of the specimen rack gripping mechanism in accordance with a width of the specimen rack, a first specimen rack and a second specimen rack, and grips and transports a plurality of the first specimen racks simultaneously.

Advantageous Effects of Invention

A plurality of types of specimen racks can be transported while an increase in size of the apparatus and also an increase in cost are suppressed.

DESCRIPTION OF EMBODIMENTS

Hereinafter, embodiments of the present invention will be described with reference to the drawings.

First Embodiment

A first embodiment of the present invention will be described with reference to FIGS. 1 to 30.

Figure 1:
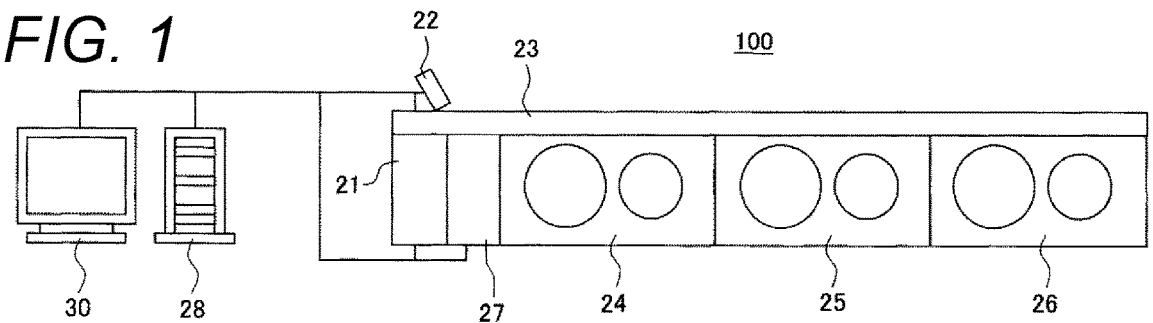
FIG. 1 is a diagram diagrammatically showing an overall configuration of an automatic analyzer according to a first embodiment.
Figure 2:
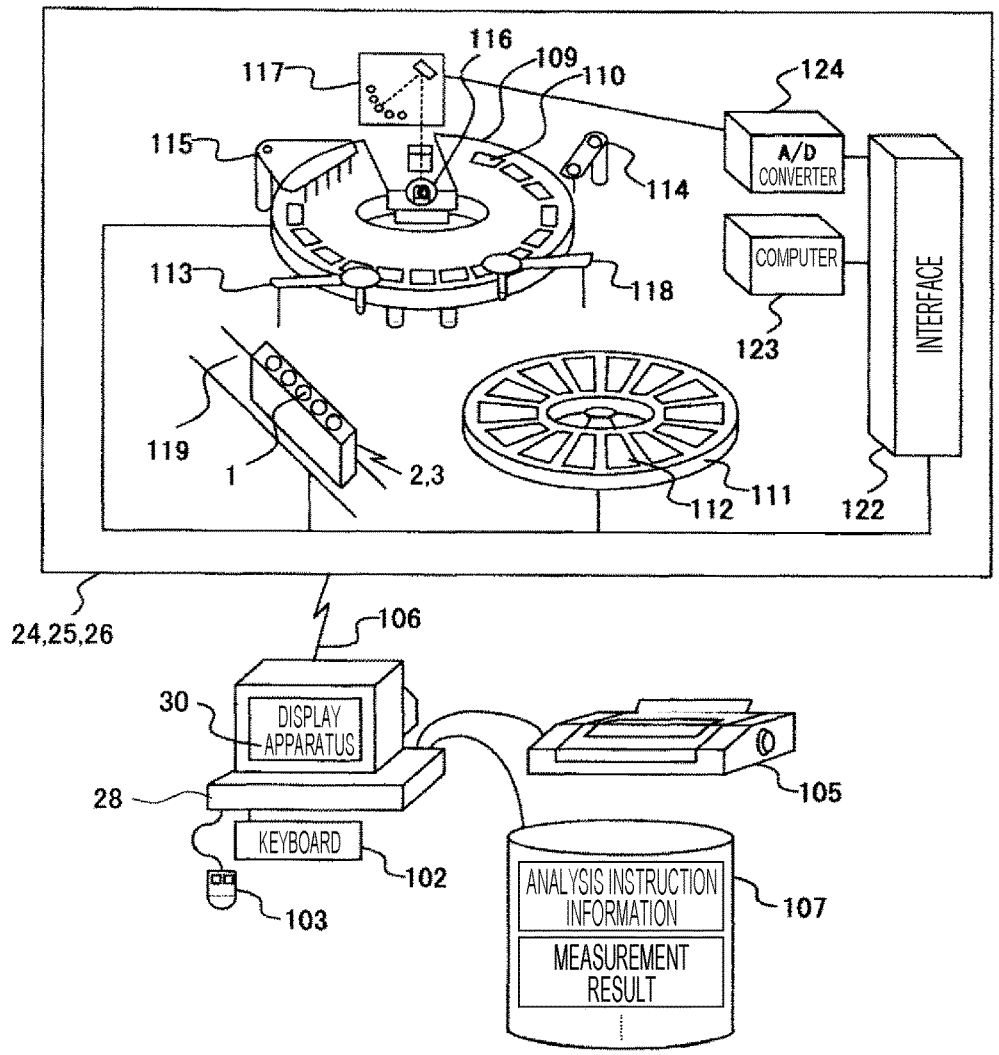
FIG. 2 is a diagram diagrammatically showing the configuration of an analysis module together with a peripheral configuration of the automatic analyzer.

FIG. 1 is a diagram diagrammatically showing an overall configuration of an automatic analyzer according to the present embodiment and FIG. 2 is a diagram diagrammatically showing the configuration of an analysis module together with a peripheral configuration of the automatic analyzer.

In FIGS. 1 and 2, an automatic analyzer 100 is roughly constructed of a specimen rack loading portion 21 into which a plurality of types (two types in the present embodiment) of specimen racks 2, 3 (described below) on which the one or more specimen containers 1 (described below) containing a biological sample (hereinafter, called a specimen) such as blood and urine are mounted by the specimen containers 1 being arranged equidistantly in a transport direction thereon is loaded, a transport device 23 that transports the specimen racks 2, 3 to each unit of the automatic analyzer 100, an ID reader 22 that reads and sends ID (identifier: called a specimen rack ID) of the specimen racks 2, 3 transported by the transport device 23 and ID (identifier: called a specimen ID) of the specimen container 1 mounted on the specimen racks 2, 3 to a general management computer 28, analysis modules 24, 25, 26 that analyze a specimen of the specimen container 1 transported by the transport device 23, a specimen rack recovery unit 27 that recovers the specimen racks 2, 3 on which the specimen container 1 for which the analysis by the analysis modules 24, 25, 26 is completed is mounted or the specimen racks 2, 3 without analysis since, the general management computer 28 that controls overall operations of the automatic analyzer 100, and a display apparatus 30 that displays various setting screens and analysis results of the automatic analyzer 100 and each component is connected by a communication path 106.

The general management computer 28 include a keyboard 102 and a mouse 103 as operation devices to input or operate various kinds of information, a storage device 107 that stores various kinds of information such as analysis instruction information and measurement results, and a printer 105 to output by printing information.

The analysis modules 24, 25, 26 are arranged along the transport line 23 and removably connected to the transport device 23. That is, the number of analysis modules in the automatic analyzer 100 can be set to any number and in the present embodiment, a case in which three analysis modules (analysis modules 24, 25, 26) are connected.

A specimen ID indicating attribute information (such as the paging number, patient name, and request analysis items) about the specimen contained in the specimen container 1 is attached to the specimen container 1 held by being mounted on the specimen racks 2, 3 and further, a rack ID having rack identification information such as a rack number is attached to the specimen racks 2, 3. Based on request analysis items or the like of the attribute information of the specimen container 1, the general management computer 28 determines which of the analysis modules 24, 25, 26 to use for the analysis and the transport device 23 transports the specimen racks 2, 3 to the determined analysis module of the analysis modules 24, 25, 26 so that an analysis operation is performed by the determined analysis module of the analysis modules 24, 25, 26.

The analysis modules 24, 25, 26 are roughly constructed of an analysis module internal transport device 119 transported by the transport device 23 to transport the specimen racks 2, 3 captured into the analysis modules 24, 25, 26 inside each of the analysis modules 24, 25, 26, a reagent disk 111 on which a plurality of reagent bottles 112 containing a reagent used for analysis of a specimen is mounted, a reaction disk 109 that makes measurements by allowing a specimen and a reagent to react, and a computer 123 connected to each component inside each of the analysis modules 24, 25, 26 via the interface 122 to control an overall operation of each of the analysis modules 24, 25, 26.

The reaction disk 109 includes a plurality of reaction containers 110 arranged concentrically, a specimen dispensing probe 113 that dispenses a specimen inside the specimen container 1 mounted on the specimen racks 2, 3 transported to a dispensing position of the analysis module internal transport device 119 to the reaction container 110, a reagent dispensing probe 118 that dispenses a reagent in the reagent bottle 112 to the reaction container 110, a stirrer 114 that stirs a mixed solution of a specimen and a reagent after being dispensed to the reaction container 110, a light source 116 that irradiates a reaction solution in the reaction container 110 with a measuring beam, a multiwavelength photometer 117 that detects light that passes through a reaction solution in the reaction container 110 after being irradiated from the light source 116, an A/D converter 124 that makes an analog/digital conversion of a detection signal of the multiwavelength photometer 117 and sends the converted signal to the computer 123 via the interface 122, and a cleaning device 115 that performs a battlefield of the reaction container 110 for which the reaction process and the measurement process are completed. The computer 123 is connected to the communication path 106 via the interface 122.

An operator gives an analysis instruction to the automatic analyzer 100 by setting the display apparatus 30 and so on using scanning devices (the keyboard 102 and the mouse 103) of the general management computer 28. The analysis instruction is stored in the storage device 107 and also sent to each of the analysis modules 24, 25, 26 via the communication path 106.

Each of the analysis modules 24, 25, 26 controls the analysis modules 24, 25, 26 in accordance with received analyses as described below. That is, a predetermined amount of specimen contained in the specimen container 1 mounted on the specimen racks 2, 3 transported to the dispensing position to the reaction container 110 by the specimen dispensing probe 113. When the dispensing process for the one specimen container 1 is completed, the analysis module internal transport device 119 moves the specimen racks 2,3 such that the next specimen container 1 is directly below (dispensing position) the specimen dispensing probe 113. When the dispensing process is completed for all of the specimen containers 1 on the specimen racks 2, 3, the specimen racks 2, 3 are unloaded by the analysis module internal transport device 119. The reaction container 110 to which a specimen is dispensed makes a rotating movement of the reaction disk 109 due to a rotating operation of the reaction disk 109. In the meantime, a reagent in the reagent bottle 112 is dispensed to the specimen in the reaction container 110 by the reagent dispensing probe 118, a reaction solution (mixed solution of the specimen and the reagent) is stirred by the stirrer 114, the absorbance of the reaction solution is measured by the light source 116 and the multiwavelength photometer 117, and then, the reaction container 110 for which the analysis is completed is cleaned by the cleaning device 115. A measurement signal of the measured absorbance is sent to the computer 123 via the A/D converter 124 and the interface 122. From the absorbance signal, various kinds of data are calculated based on the analysis method preset for each analyzed material. If the specimen to be analyzed is a standard liquid specimen, working curve data is calculated from set concentration data. Also, if the specimen to be analyzed is a patient specimen or a control specimen, concentration data is calculated from working curve data obtained by measuring the standard liquid specimen. The concentration data is sent to the general management computer 28 via the communication path 106 as a measurement result after information obtained by coding the type of specimen is attached. The general management computer 28 stores the received measurement result in the storage device 107 and also displays the result in a display apparatus 104 or outputs the result from the printer 105 as printed matter.

Figure 3:
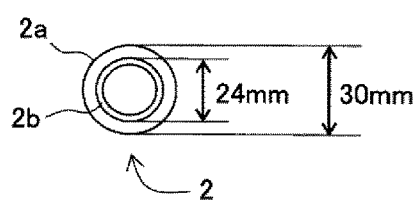
FIG. 3 is a diagram diagrammatically showing a specimen container and a specimen rack and a top view showing a specimen rack on which one specimen container is mounted.
Figure 4:
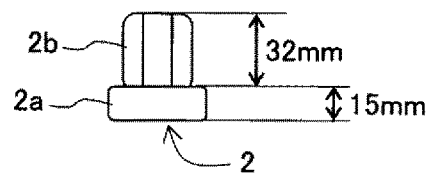
FIG. 4 is a diagram diagrammatically showing the specimen container and the specimen rack and a side view showing the specimen rack on which one specimen container is mounted.
Figure 5:
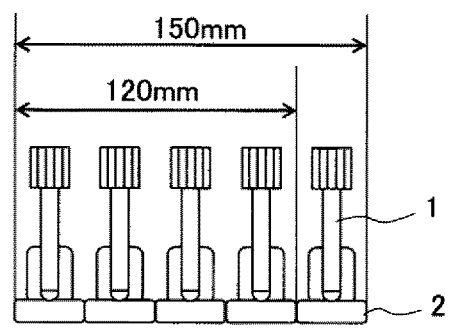
FIG. 5 is a diagram diagrammatically showing the specimen container and the specimen rack and a side view showing a state in which a specimen container is mounted on the specimen rack on which one specimen container is mounted.
Figure 6:
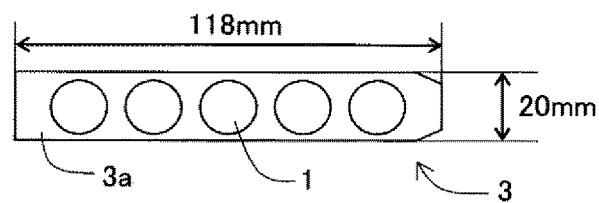
FIG. 6 is a diagram showing the specimen rack on which a plurality of specimen containers is mounted by the specimen containers being arranged equidistantly in a transport direction and a top view showing a state in which the specimen containers are mounted.
Figure 7:
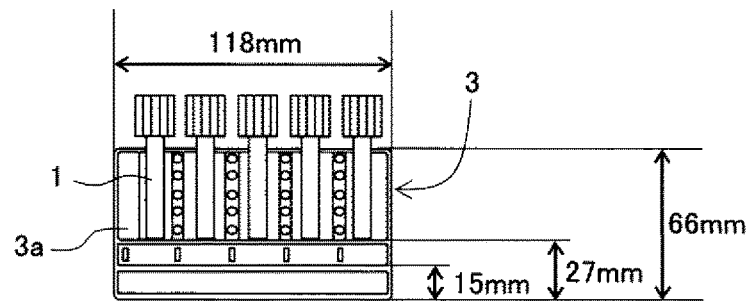
FIG. 7 is a diagram showing the specimen rack on which the plurality of specimen containers is mounted by the specimen containers being arranged equidistantly in the transport direction and a side view showing a state in which the specimen containers are mounted.

FIGS. 3 to 7 are diagrams diagrammatically showing specimen containers and specimen racks used in the present embodiment. FIGS. 3 to 5 are diagrams showing specimen racks on each of which one specimen container is mounted, FIG. 3 is a top view, FIG. 4 is a side view, and FIG. 5 is a side view showing a state in which specimen containers are mounted. FIGS. 6 and 7 are diagrams showing specimen racks on each of which a plurality of specimen containers is mounted by the specimen containers being arranged equidistantly in the transport direction, FIG. 6 is a top view showing a state in which specimen containers are mounted, and FIG. 7 is a side view showing a state in which specimen containers are mounted.

In FIGS. 3 to 5, the specimen rack 2 (first specimen rack) on which the one specimen container 1 is mounted includes a base portion 2a formed in a diameter (for example, 30 mm in outside diameter) smaller than that of the transport path (described below) in the transport device 23 and a specimen container holding portion 2b formed above the base portion 2a in a diameter (for example, 24 mm in outside diameter) smaller than that of the base portion 2a to hold the specimen container 1. The base portion 2a is formed in a height of, for example, 15 mm and the specimen container holding portion 2b is formed above the base portion 2a in a height of 32 mm. That is, when the specimen racks 2 are arranged on the transport path with the base portions 2a in contact, for example, four specimen racks 2 are arranged, the length thereof is 120 mm and when five specimen racks 2 are arranged, the length thereof is 150 mm.

In FIGS. 6 and 7, the specimen rack 3 (second specimen rack) on which a plurality (five in the present embodiment) of the specimen containers 1 is mounted includes a specimen container holding portion 3b formed to have a width (for example, 20 mm in width) in the transport direction narrower than the specimen container holding portion 2b of the first specimen rack 2 and to be higher (for example, 66 mm in height) than a top end portion of the specimen container holding portion 2b of the first specimen rack 2.

Figure 8:
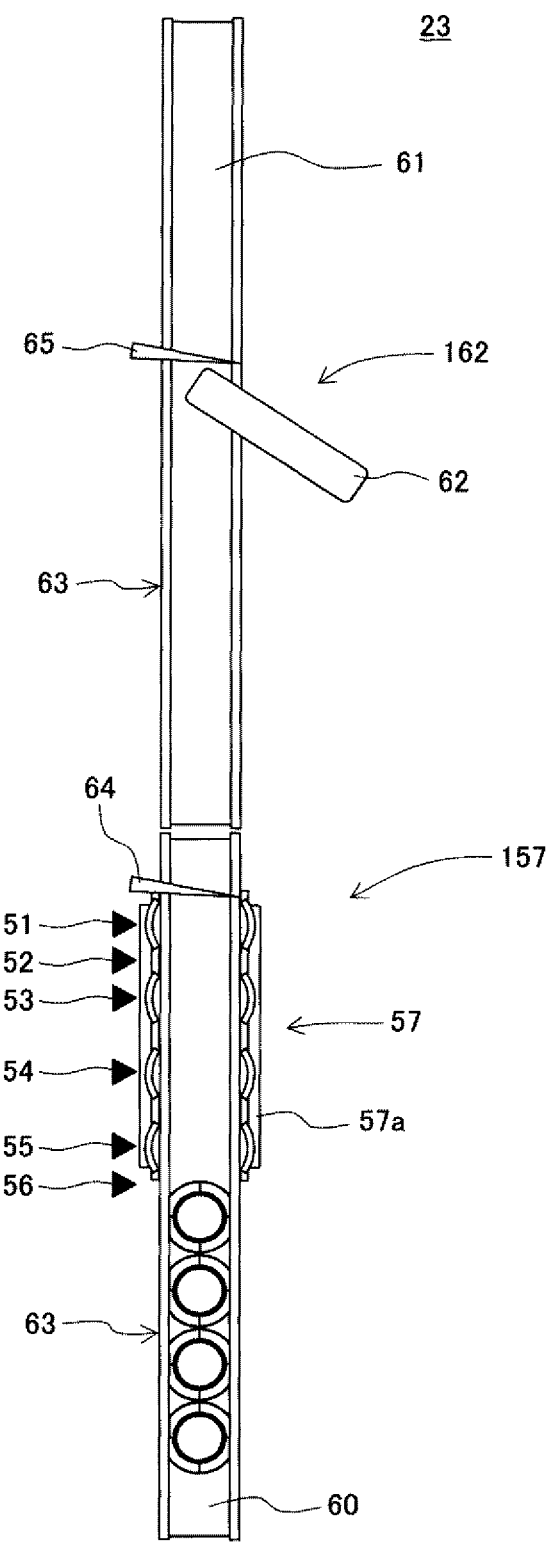
FIG. 8 is a top view schematically showing main components of a transport device.
Figure 9:
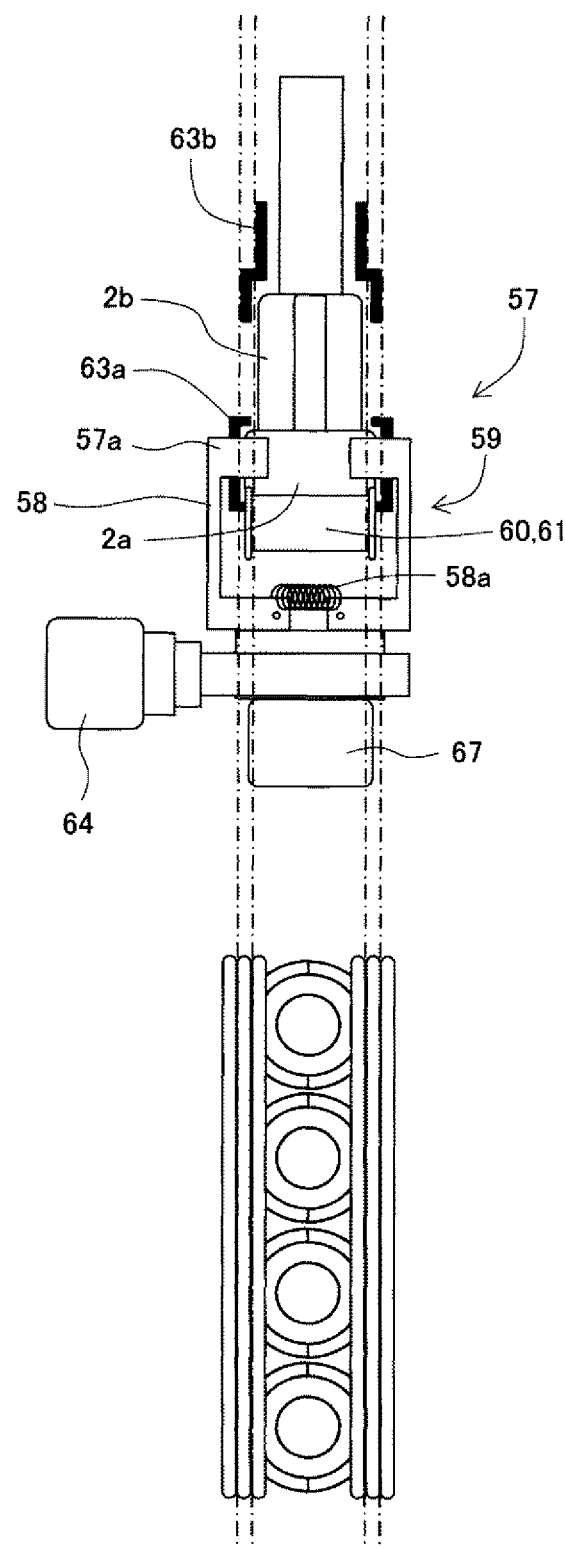
FIG. 9 is a diagram diagrammatically showing a physical relationship between a transport mechanism of the transport device and a transport path when transporting a first specimen rack.

FIG. 8 is a top view schematically showing main components of a transport device. FIG. 9 is a diagram diagrammatically showing the physical relationship between the transport mechanism of the transport device and the transport path when a first specimen rack is transported and FIG. 10 is a diagram diagrammatically showing the physical relationship between the transport mechanism of the transport device and the transport path when a second specimen rack is transported.

Figure 10:
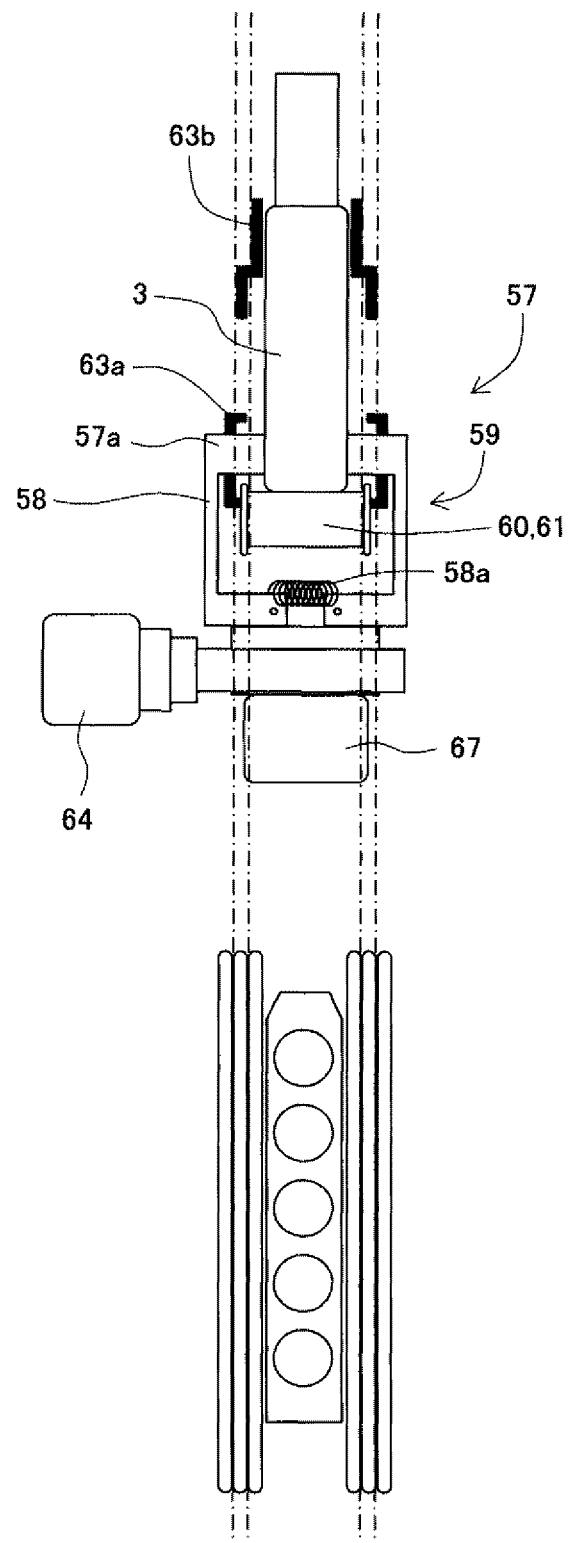
FIG. 10 is a diagram diagrammatically showing the physical relationship between the transport mechanism of the transport device and the transport path when transporting a second specimen rack.

In FIGS. 8 to 10, the transport device 23 is roughly constructed of belt conveyors 60, 61 longitudinally arranged along the transport path that transports the specimen racks 2, 3 on which the specimen container 1 is mounted, a guide member 63 arranged on both sides of the belt conveyors 60, 61, a rack stopper 64 provided in a specimen rack gripping position 157 arranged on the belt conveyor 60, a plurality of sensors 51 to 56 that detects the presence/absence of the specimen racks 2, 3 in the specimen rack gripping maintenance 157, the transport mechanism 57 that grips the specimen racks 2, 3 in the specimen rack gripping position 157 to transport along the transport path, a rack stopper 65 provided in a specimen dispensing position 162 arranged on the belt conveyor 61, and a dispensing probe 62 that dispenses a specimen from the specimen container 1 mounted on the specimen racks 2, 3 in the specimen dispensing position 162.

The belt conveyors 60, 61 are driven by a drive mechanism (not shown) such that the specimen racks 2, 3 arranged on the belt conveyors 60, 61 are transported toward the downstream side of the transport path.

The transport mechanism 57 includes a specimen rack gripping mechanism 59 that grips the specimen racks 2, 3 in the specimen rack gripping position 157 using the gripping plates 57a from both sides of flanks in the transport direction to transport along the transport path and a specimen rack transport mechanism axis drive motor 66 that drives the specimen rack gripping mechanism 59 along the transport path.

The specimen rack gripping mechanism 59 includes two gripping plates 57a, an arm 58 that holds each of the gripping plates 57a from both sides below, a spring 58a that energizes the arm 58 in the direction of an open state of the gripping plates 57a (that is, in the direction in which the distance between the gripping plates 57a increases), and an opening and closing motor 67 that drives to open or close the gripping plates 57a by driving the arm 58. The opening and closing motor 67 is controlled by the general management computer 28 and controls the distance between the gripping plates 57a of the specimen rack gripping mechanism 59 in accordance with the width of the specimen racks 2, 3.

The guide member 63 includes a first guide member 63a provided along the transport path on both sides of the transport path to guide movement in the transport direction while limiting movement in the width direction of the specimen container holding portion 2b of the first specimen rack 2 and a second guide member 63b provided along the transport path on both sides of the transport path above the top end of the specimen container holding portion 2b of the first specimen rack 2 to guide movement in the transport direction while limiting movement in the width direction of the specimen container holding portion 3a of the second specimen rack 3. In the present embodiment, a configuration having two stages of guide, an upper guide (the second guide member 63b) and a lower guide (the first guide member 63a), is shown, but the present embodiment is not limited to such an example and the guide function of specimen racks may further be improved by providing a plurality of stages of three stages or more by fitting to the shape of the specimen rack that is symmetric with respect to the transport path.

Figure 11:
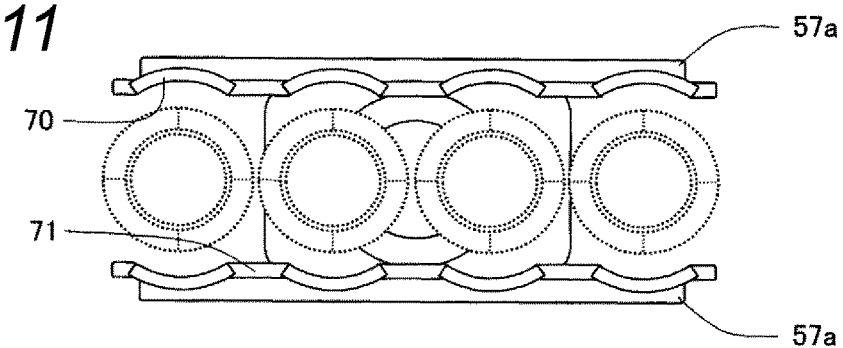
FIG. 11 is a diagram showing the configuration of a gripping plate of the transport mechanism and a diagram showing an open state of the gripping plates of the transport mechanism.
Figure 12:
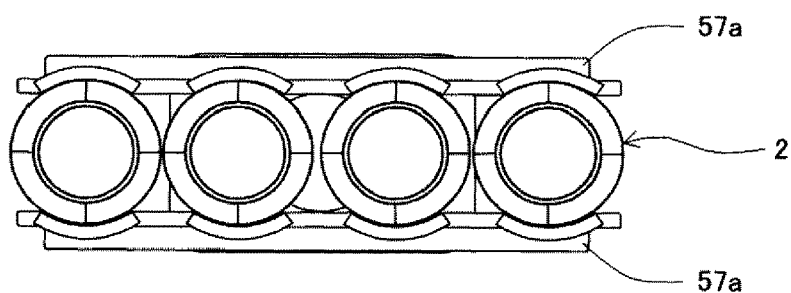
FIG. 12 is a diagram showing the configuration of the gripping plate of the transport mechanism and a diagram showing a closed state in which the first specimen rack is gripped.
Figure 13:
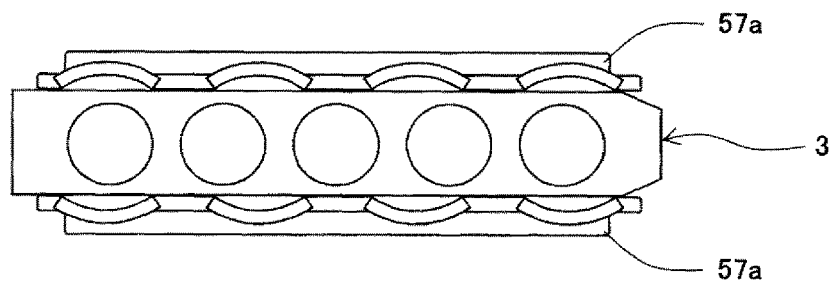
FIG. 13 is a diagram showing the configuration of the gripping plate of the transport mechanism and a diagram showing a closed state in which the second specimen rack is gripped.

FIGS. 11 to 13 are diagrams showing the configuration of gripping plates of the transport mechanism, FIG. 11 is a diagram showing an open state of the gripping plates of the transport mechanism, FIG. 12 is a diagram showing a closed state in which a first specimen rack is gripped, and FIG. 13 is a diagram showing a closed state in which a second specimen rack is gripped.

In FIGS. 11 to 13, a curved surface portion 70 formed along a side surface shape of the base portion 2a of the first specimen rack 2 and arranged equidistantly in the transport direction and a flat surface portion 71 formed along a side surface shape of the second specimen rack 3 and arranged between curved surface portions in the transport direction are provided on surfaces opposite to each other of the gripping plates 57a. The length in the transport direction of the gripping plate 57a is configured to be approximately the same as that of a thinner specimen rack (in the present embodiment, the second specimen rack 3) in the transport direction.

When the first specimen rack 2 is gripped by the gripping plates 57a of the transport mechanism 57 by the gripping plates 57a being changed from an open state (see FIG. 11) in which the specimen racks 2, 3 are released to a closed state, the side surface of the base portion 2a of the first specimen rack 2 is sandwiched between the curved surface portions 70 of the gripping plates 57a on both sides of the transport path and held in a stable manner (see FIG. 12). Also when the second specimen rack 3 is gripped by the gripping plates 57a of the transport mechanism 57 by the gripping plates 57a being changed from an open state (see FIG. 11) in which the specimen racks 2, 3 are released to a closed state, the side surface of the second specimen rack 3 is sandwiched between the flat surface portions 71 of the gripping plates 57a on both sides of the transport path and held in a stable manner.

Figure 14:
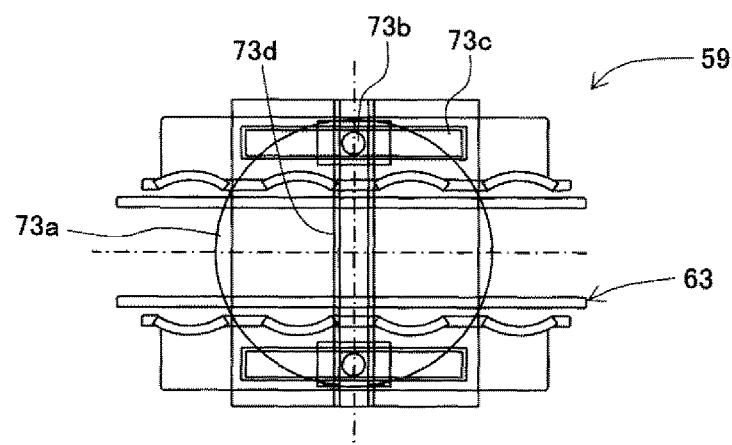
FIG. 14 is a diagram showing a switching structure of the gripping plate in an opening and closing motor of a specimen rack gripping mechanism and a diagram showing an open state of the gripping plates.
Figure 15:
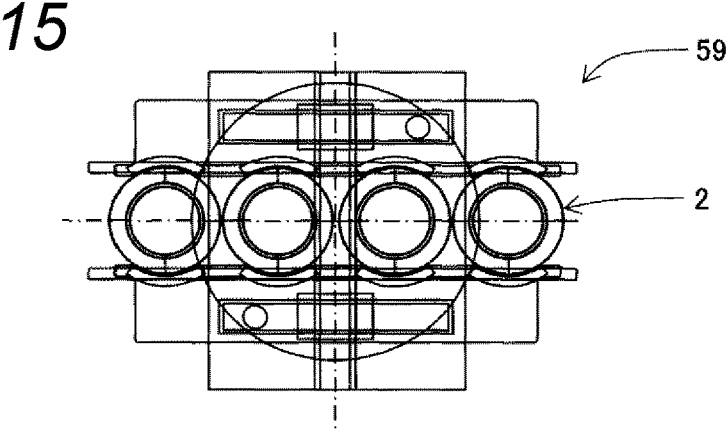
FIG. 15 is a diagram showing the switching structure of the gripping plate in the opening and closing motor of the specimen rack gripping mechanism and a diagram showing a closed state in which the first specimen rack is gripped.
Figure 16:
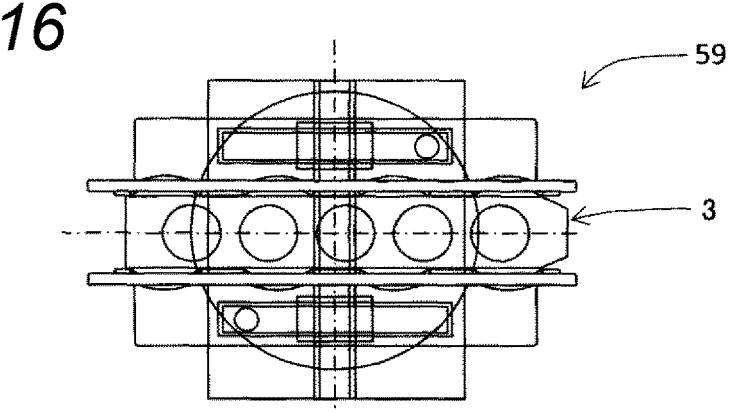
FIG. 16 is a diagram showing the switching structure of the gripping plate in the opening and closing motor of the specimen rack gripping mechanism and a diagram showing a closed state in which the second specimen rack is gripped.

FIGS. 14 to 16 are diagrams showing a switching structure of the gripping plates 57a in the opening and closing motor 67 of the specimen rack gripping mechanism 59, FIG. 14 is a diagram showing an open state of the gripping plates 57a, FIG. 15 is a diagram showing a closed state in which the first specimen rack is gripped, and FIG. 16 is a diagram showing a closed state in which the second specimen rack is gripped.

A switching mechanism of the specimen rack gripping mechanism 59 includes a disk-shaped member 73a that is driven to rotate in a horizontal direction by the opening and closing motor 67 using the middle in the transport direction and the width direction of the transport path of the gripping plate 57a as a rotation center, a sliding protrusion 73b provided on the surface on the side of the gripping plate 57a in two positions symmetric with respect to the center of the disk-shaped member 73a, a longitudinal guide 73c provided on the gripping plate 57a along the transport path to guide movement in the transport direction of the sliding protrusion 73b, and a transverse guide 73d that guides movement in the width direction of the transport path of the gripping plate 57a.

The first specimen rack 2 and the second specimen rack 3 are gripped by the gripping plates 57a by the disk-shaped member 73a being driven to rotate by the opening and closing motor 67 from an open state (see FIG. 14) in which the specimen racks 2, 3 are released from the gripping plates 57a of the transport mechanism 57 and the gripping plate 57a having the longitudinal guide 73c that guides movement of the sliding protrusion 73b being moved in the width direction of the transport path while being guided by the transverse guide 73d with an approaching relative position of the sliding protrusion 73b in the width direction of the transport path (see FIGS. 15 and 16). That is, the gripping plate 57a can be driven to open or close by changing the rotating direction of the opening and closing motor 67. Also, by changing the rotation angle of the disk-shaped member 73a by the opening and closing motor 67, the distance (opening and closing distance) between the gripping plates 57a can be controlled.

Figure 17:
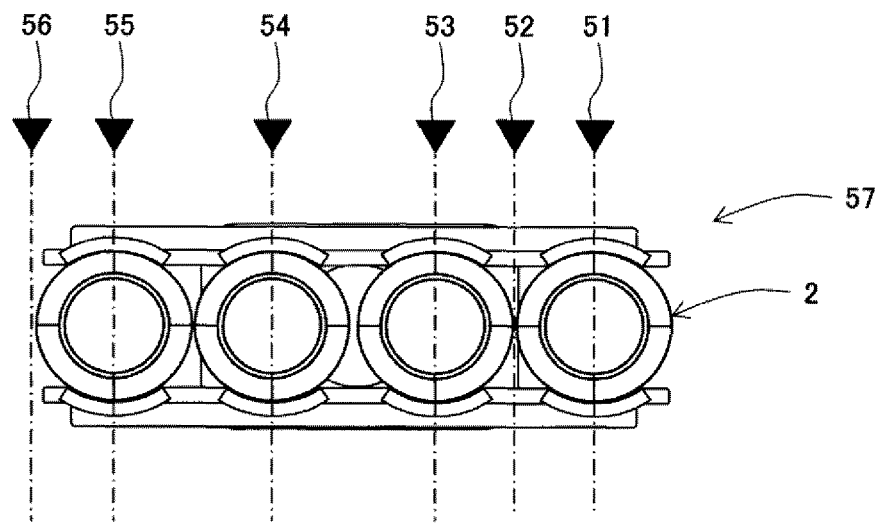
FIG. 17 is a diagram showing the physical relationship between each sensor and the specimen rack in a specimen rack gripping position and a diagram showing an example in which four first specimen racks are stopped in the specimen rack gripping position by a rack stopper.
Figure 18:
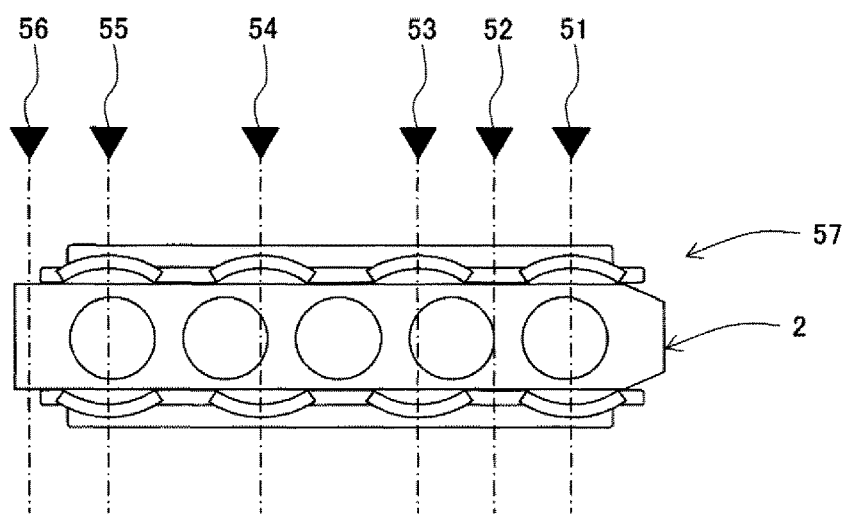
FIG. 18 is a diagram showing the physical relationship between each sensor and the specimen rack in the specimen rack gripping position and a diagram showing an example in which the second specimen rack is stopped.

FIGS. 17 and 18 are diagrams showing the physical relationship between each sensor and the specimen rack in the specimen rack gripping position, FIG. 17 is a diagram showing an example in which four first specimen racks are stopped in the specimen rack gripping position by a rack stopper, and FIG. 18 is a diagram showing an example in which a second specimen rack is stopped.

As shown in FIG. 17, the sensors 51 to 56 are arranged so as to detect the presence/absence of the specimen racks 2, 3 in the center position of the No. 1 first specimen rack 2 (sensor 51), the position between the No. 1 and No. 2 first specimen racks 2 (sensor 52), the center position of the No. 2 first specimen rack 2 (sensor 53), the center position of the No. 3 first specimen rack 2 (sensor 54), the center position of the No. 4 first specimen rack 2 (sensor 55), and the position of the upstream end of the No. 4 first specimen rack 2 (sensor 56) in the order from the downstream side of the transport path. In each of the sensors 51 to 56, an output signal (specimen rack presence/absence information) is ON when the specimen racks 2, 3 are detected in each position and the output signal (specimen rack presence/absence information) is OFF when the specimen racks 2, 3 are not detected.

When the four first specimen racks 2 are in the specimen rack gripping position 157 (see FIG. 17), output signals obtained from the sensors 51, 52 are ON, OFF respectively and output signals obtained from the sensors 55, 56 are ON, OFF respectively.

When, as shown in FIG. 18, the second specimen rack 3 is in the specimen rack gripping position 157, output signals obtained from the sensors 51, 52 are ON, ON respectively and output signals obtained from the sensors 55, 56 are ON, ON respectively.

Thus, based on specimen rack presence/absence information obtained from the sensors 51 to 56, which of the specimen racks 2, 3 is present in the specimen rack gripping position 157 can be determined and thus, a plurality of specimen racks having different widths can be determined.

Figure 19:
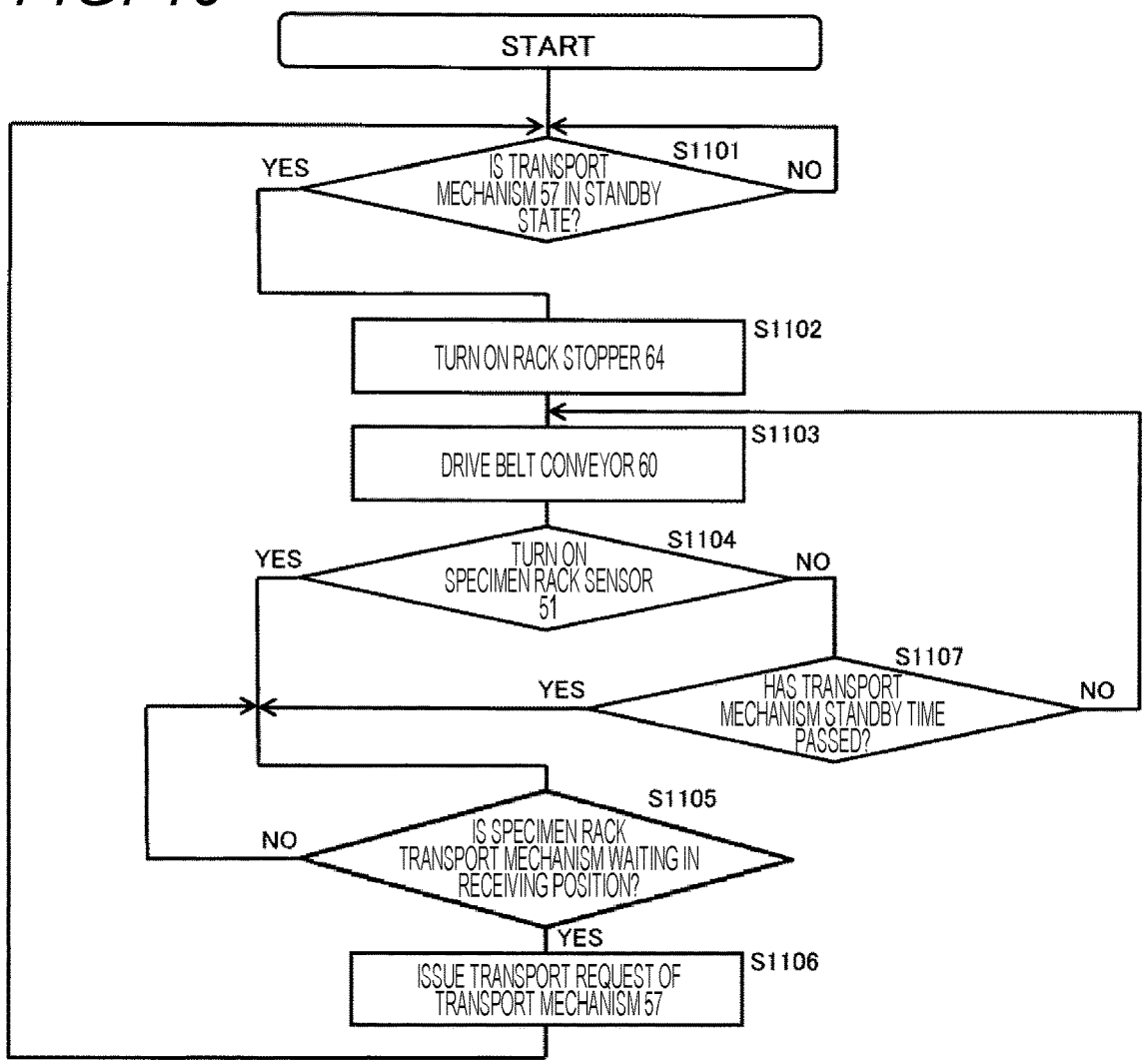
FIG. 19 is a flow chart showing the flow of a transport process of the specimen rack by the transport device and a flow chart showing a specimen rack transport request process of the transport process.
Figure 20:
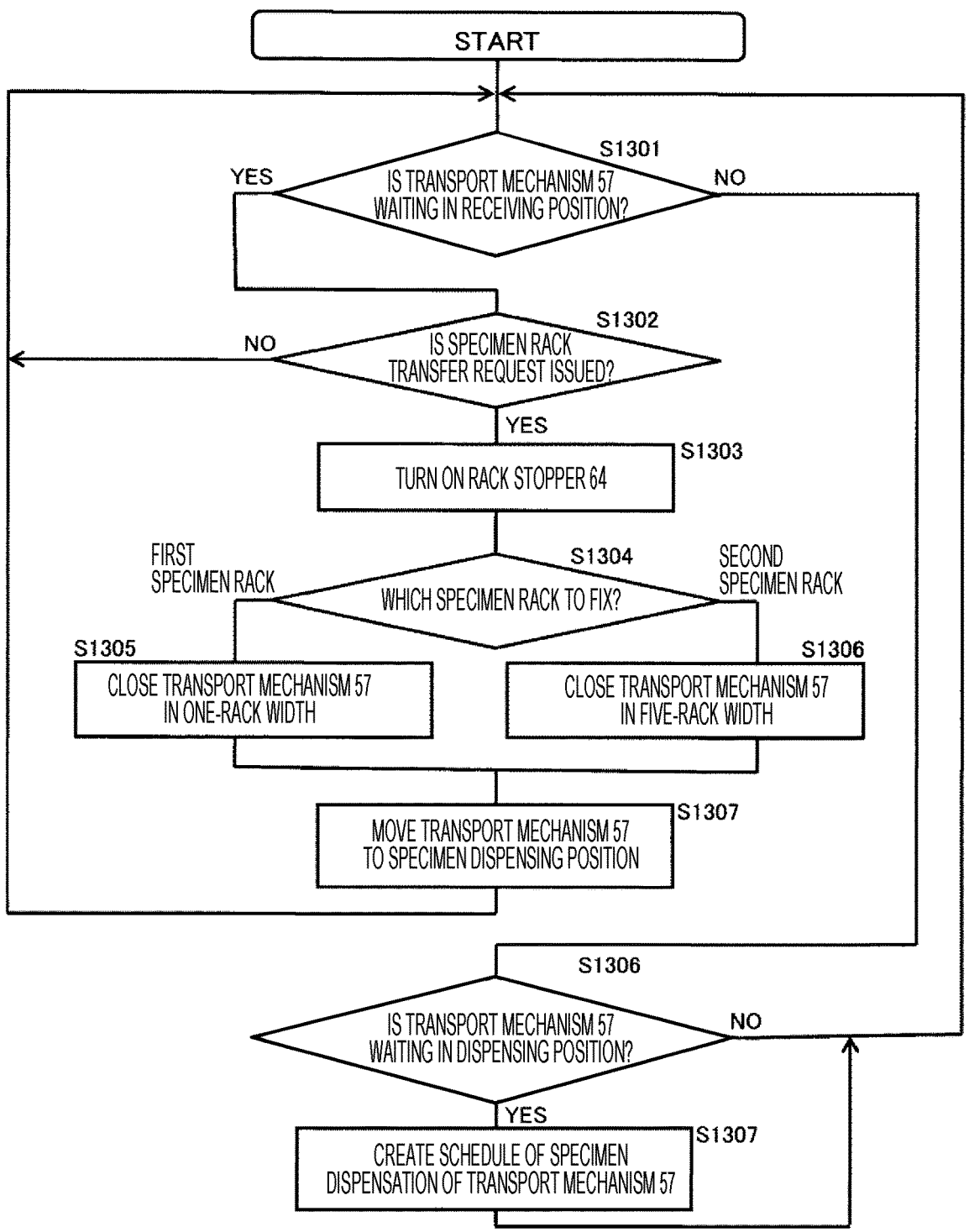
FIG. 20 is a flow chart showing the flow of the transport process of the specimen rack by the transport device and a flow chart showing a specimen rack movement process of the transport process.
Figure 21:
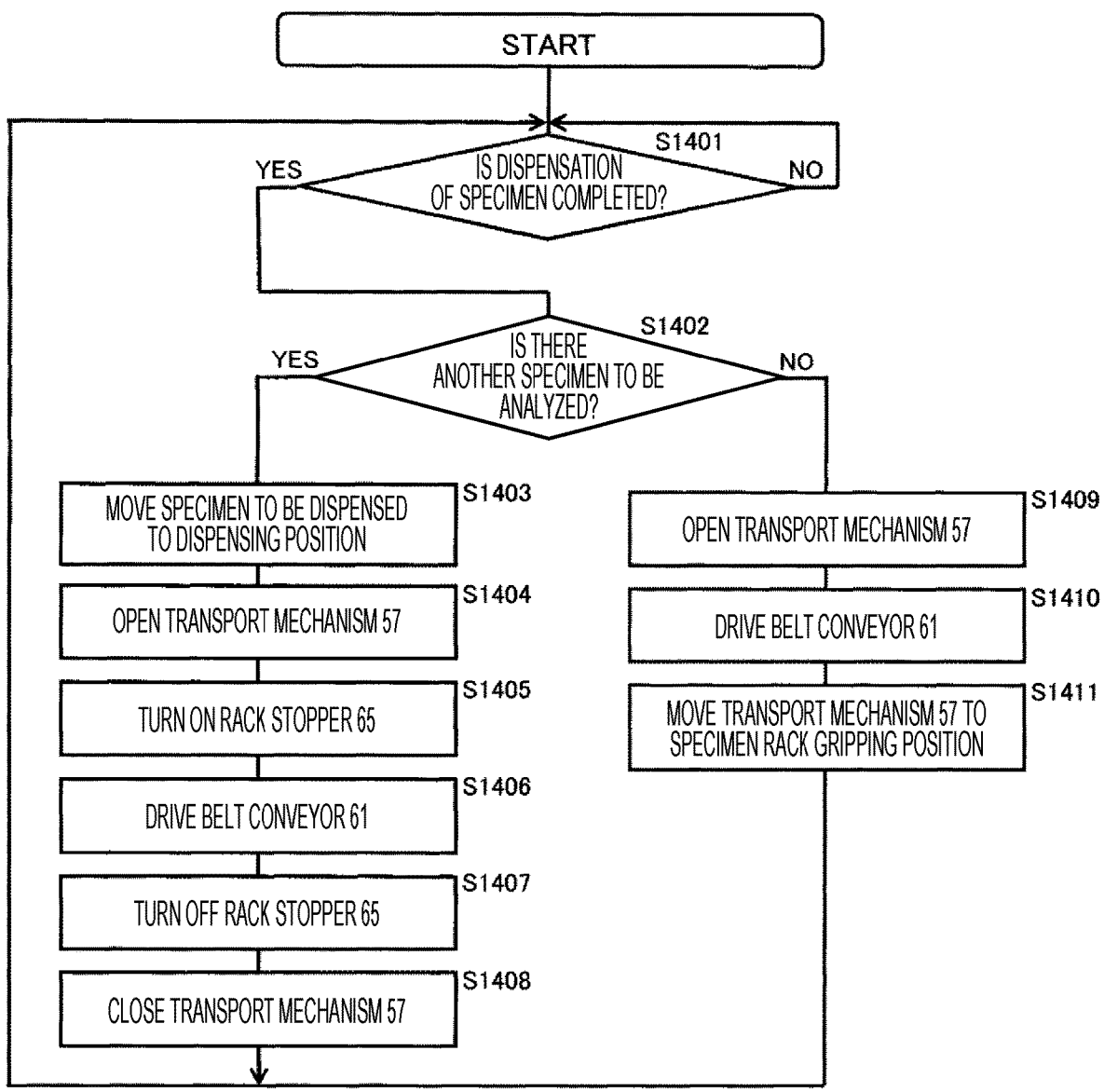
FIG. 21 is a flow chart showing the flow of the transport process of the specimen rack by the transport device and a flow chart showing a specimen dispensing process of the transport process.

FIGS. 19 to 21 are flow charts showing the flow of a transport process of a specimen rack by a transport device, FIG. 19 is a flow chart showing a specimen rack transport request process of the transport process, FIG. 20 is a flow chart showing a specimen rack movement process of the transport process, and FIG. 21 is a flow chart showing a specimen dispensing process of the transport process.

In the specimen rack transport request process of the transport process, as shown in FIG. 19, the general management computer 28 first determines whether the transport mechanism 57 is in a standby state (state of not being driven) (step S1101) and if the determination result is NO, repeats the determination in step S1101 until the determination result becomes YES. If the determination result in step S1101 is YES, the general management computer 28 turns on the rack stopper 64 to block movement of the specimen racks 2, 3 on the belt conveyor 60 (step S1102) and drives the belt conveyor 60 (step S1103). Subsequently, the general management computer 28 determines whether the sensor 51 is ON (step S1104) and if the determination result is NO, determines whether a preset transport mechanism standby time has passed (step S1107). If the determination result in step S1107 is NO, the general management computer 28 returns to the process in step S1103. If the determination result in step S1104 is YES or the determination result in step S1107 is YES, the general management computer 28 determines whether the transport mechanism 57 is waiting in the specimen rack gripping position 157 (step S1104). If the determination result in step S1105 is YES, the general management computer 28 issues a specimen rack transport request to transport the specimen racks 2, 3 in the specimen rack gripping position 157 to the transport mechanism 57 (step S1106) and then, returns to the process in step S1101. If the determination result in step S1106 is NO, the general management computer 28 repeats the determination in step S1106 until the determination result becomes YES.

Figure 22:
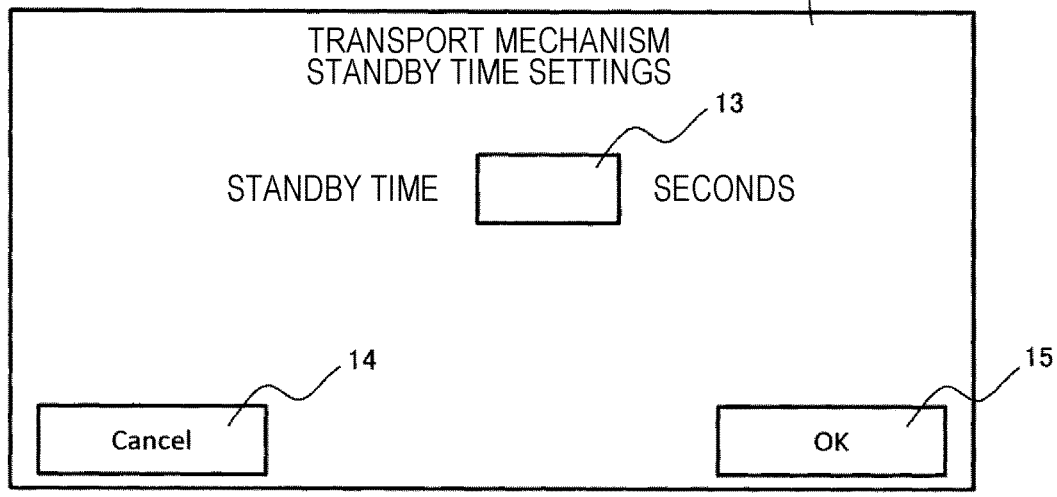
FIG. 22 is a diagram showing a setting screen to set a transport mechanism standby time in the specimen rack transport request process.

FIG. 22 is a diagram showing a setting screen to set a transport mechanism standby time in the specimen rack transport request process.

A setting screen 12 of the transport mechanism standby time is displayed in the display apparatus 30 and set by an operation using operating device (the keyboard 102, the mouse 103) and includes an input unit 13 of the standby time, a cancel button 14 to cancel input, and an OK button 15 to confirm the input result. The standby time of the transport mechanism 57 is input into the input unit 13 by operating devices and confirmed by an operation of the OK button 15.

In the specimen rack movement process of the transport process, as shown in FIG. 20, the general management computer 28 first determines whether the transport mechanism 57 is waiting in the specimen rack gripping position 157 (step S1301) and if the determination result is YES, determines whether a specimen rack transport request has been issued in the specimen rack transport request process (step S1302). If the determination result in step S1302 is NO, the general management computer 28 repeats the determination in step S1301 and if the determination result is YES, the general management computer 28 releases movement of the specimen racks 2, 3 on the belt conveyor 60 by turning off the rack stopper 64 to determine whether the specimen rack in the specimen rack gripping position 157 is the specimen rack 2 (first specimen rack) on which the one specimen container 1 is mounted or the specimen rack 3 (second specimen rack) on which a plurality (five) of the specimen containers 1 is mounted (step S1304). If the determination result in step S1304 is the first specimen rack 2, the general management computer 28 closes the gripping plates 57a of the transport mechanism 57 such that the distance between the gripping plates 57a becomes the width of the first specimen rack 2 (step S1305) and moves the transport mechanism 57 to the specimen dispensing position 162 (step S1307) before returning to the process in step S1301. Similarly, if the determination result in step S1304 is the second specimen rack 3, the general management computer 28 closes the gripping plates 57a of the transport mechanism 57 such that the distance between the gripping plates 57a becomes the width of the second specimen rack 3 (step S1306) and moves the transport mechanism 57 to the specimen dispensing position 162 (step S1307) before returning to the process in step S1301. If the determination result in step S1301 is NO, the general management computer 28 determines whether the transport mechanism 57 is waiting in the specimen dispensing position 162 (step S1308) and if the determination result is YES, creates a specimen dispensing schedule for the transport mechanism 57 before returning to the determination in step S1301. Also, if the determination result in step S1308 is NO, the general management computer 28 returns to the determination in step S1301.

In the specimen dispensing process of the transport process, as shown in FIG. 21, the general management computer 28 first determines whether dispensation of the specimen in the specimen container 1 mounted on the specimen racks 2, 3 in the specimen dispensing position 162 is completed (step S1401) and if the determination result is NO, repeats the process in step S1401 until the determination result becomes YES. If the determination result in step S1401 is YES, the general management computer 28 determines whether the specimen to be dispensed is contained in the other specimen containers 1 mounted on the specimen racks 2, 3 (step S1402) and if the determination result is YES, moves the specimen container 1 to be dispensed to the dispensing position (step S1403), puts the transport mechanism 57 to an open state (step S1404), blocks movement of the specimen racks 2, 3 on the transport path by turning on the rack stopper 65 (step S1405), releases and transports only the specimen racks 2, 3 on which the specimen container 1 whose dispensation is completed is mounted from the transport mechanism 57 to the next analysis module by driving the belt conveyor 61 (step S1406), opens the transport path by turning off the rack stopper 65 (step S1407), and puts the transport mechanism 57 to a closed state (step S1408) before returning to the determination in step S1401. If the determination result in step S1402 is NO, the general management computer 28 puts the transport mechanism 57 to an open state (step S1409), drives the belt conveyor 61 (step S1410), and moves the transport mechanism 57 to the specimen rack gripping position 157 (step S1411) before returning to the determination in step S1401.

The transport operation of the specimen racks in the present embodiment configured as described above will be described with reference to FIGS. 23 to 30. FIGS. 23 to 30 are diagrams diagrammatically showing states of the gripping operation and transport operation of the specimen racks 2, 3 in the specimen rack gripping position 157.

Figure 23:
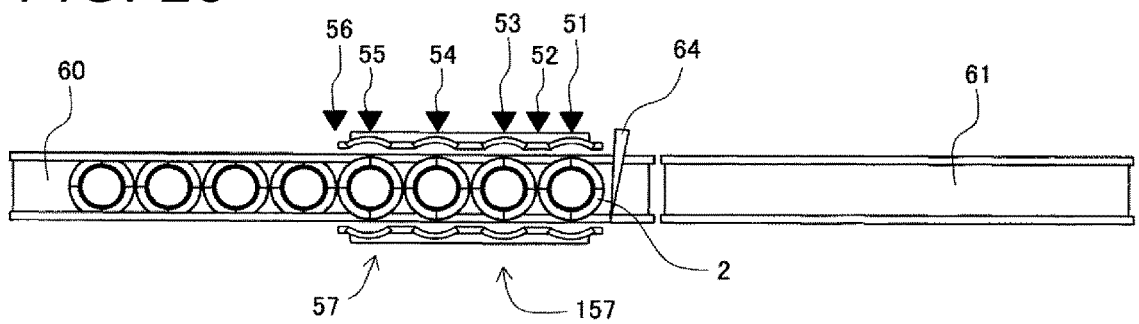
FIG. 23 is a diagram diagrammatically showing a state of a gripping operation and a transport operation of the specimen rack in the specimen rack gripping position and a diagram showing a state in which four or more specimen racks (first specimen racks), each of which having one specimen container mounted thereon, are successively stopped by the rack stopper in the specimen rack gripping position.
Figure 24:
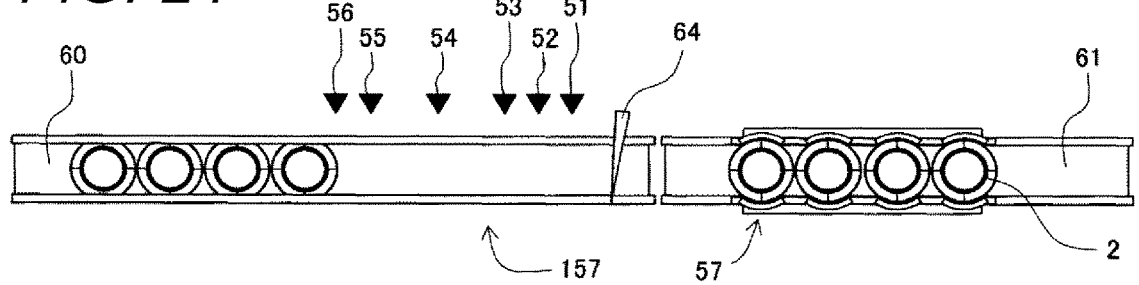
FIG. 24 is a diagram diagrammatically showing the state of the gripping operation and the transport operation of the specimen rack in the specimen rack gripping position and a diagram showing a state in which four first specimen racks on the downstream side are gripped by the transport mechanism and transported downstream.

FIG. 23 is a diagram showing a state in which the four specimen racks 2 (first specimen racks) or more, each of which having the one specimen container 1 mounted thereon, are successively stopped by the rack stopper 64 in the specimen rack gripping position 157 and FIG. 24 is a diagram showing a state in which the four first specimen racks 2 on the downstream side are gripped by the transport mechanism 57 and transported downstream.

When, as shown in FIG. 23, the four specimen racks 2 (first specimen racks) or more are stopped in the specimen rack gripping position 157, output signals (specimen rack presence/absence information) obtained from the sensors 51, 52 are ON, ON respectively and output signals (specimen rack presence/absence information) obtained from the sensors 55, 56 are ON, OFF respectively. In this case, specimen racks stopped in the specimen rack gripping position 157 are all determined to be the specimen racks 2 and the specimen racks 2 are gripped by determining the gripping width between the gripping plates 57a of the transport mechanism 57 by fitting to the width of the specimen rack 2 and setting a closed state.

Then, as shown in FIG. 24, the rack stopper 64 is driven to be turned off and the belt conveyor 60 is released so that only the four specimen racks 2 gripped by the transport mechanism 57 are transported on the belt conveyor 61 on the downstream side.

Also, by blocking on the belt conveyor 60 again using the rack stopper 64 and operating the belt conveyor 60 again, subsequent specimen racks 2 positioned upstream of the specimen rack gripping position 157 can be stopped and transported by a similar operation.

Figure 25:
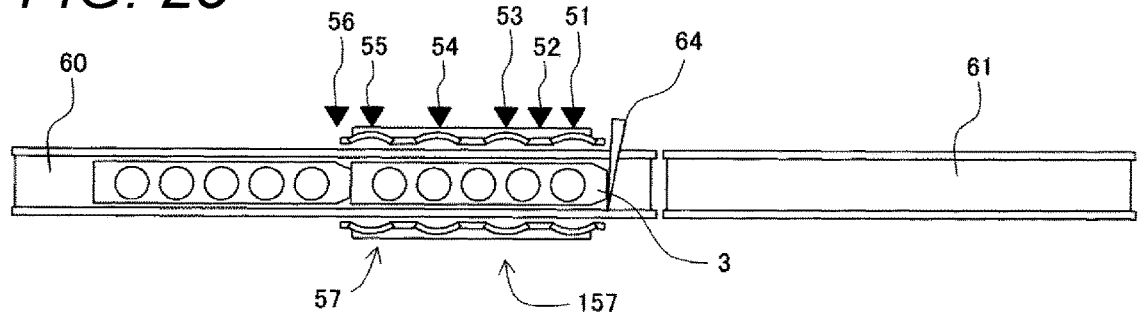
FIG. 25 is a diagram showing a state in which a plurality of specimen racks (second specimen racks), each of which having a plurality (five) of the specimen containers 1 mounted thereon, is stopped by the rack stopper in the specimen rack gripping position.
Figure 26:
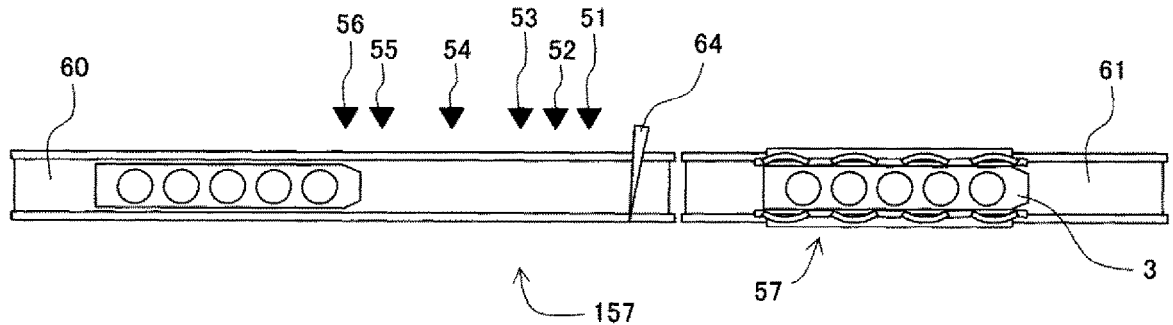
FIG. 26 is a diagram showing a state in which the second specimen rack is gripped by the transport mechanism 57 and transported downstream.

FIG. 25 is a diagram showing a state in which a plurality of the specimen racks 3 (second specimen racks), each of which having a plurality (five) of the specimen containers 1 mounted thereon, is successively stopped by the rack stopper 64 in the specimen rack gripping position 157 and FIG. 26 is a diagram showing a state in which the second specimen rack 3 on the downstream side is gripped by the transport mechanism 57 and transported downstream.

When, as shown in FIG. 25, the plurality of specimen racks 3 (second specimen racks) are stopped in the specimen rack gripping position 157, output signals (specimen rack presence/absence information) obtained from the sensors 51, 52 are ON, ON respectively and output signals (specimen rack presence/absence information) obtained from the sensors 55, 56 are ON, ON respectively. In this case, the specimen rack stopped in the specimen rack gripping position 157 is determined to be the specimen rack 3 (second specimen rack) and the specimen rack 3 is gripped by determining the gripping width between the gripping plates 57*a* of the transport mechanism 57 by fitting to the width of the specimen rack 3 and setting a closed state.

Then, as shown in FIG. 26, the rack stopper 64 is driven to be turned off and the belt conveyor 60 is released so that the specimen rack 3 gripped by the transport mechanism 57 is transported on the belt conveyor 61 on the downstream side.

Also, by blocking on the belt conveyor 60 again and operating the belt conveyor 60 again using the rack stopper 64, subsequent specimen racks 3 positioned upstream of the specimen rack gripping position 157 can be stopped and transported by a similar operation.

Figure 27:
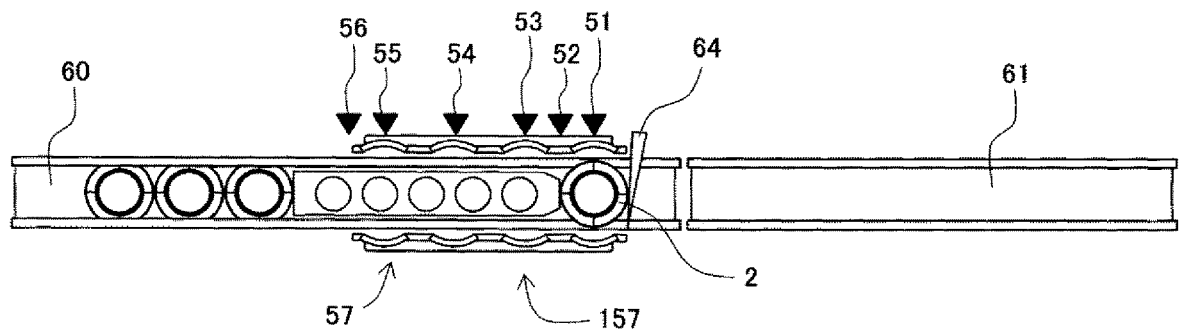
FIG. 27 is a diagram showing a state in which the specimen racks (first specimen racks), each of which having one specimen container mounted thereon, and the second specimen rack having a plurality (five) of specimen containers mounted thereon are successively stopped by the rack stopper in the specimen rack gripping position.
Figure 28:
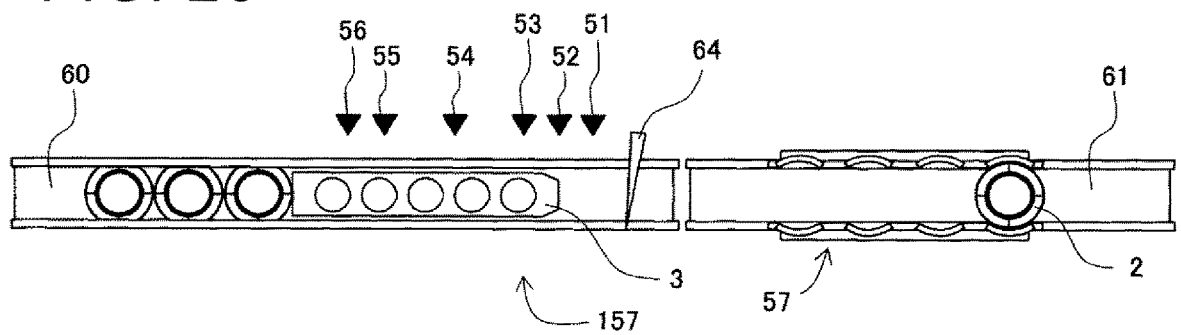
FIG. 28 is a diagram showing a state in which only the most downstream first specimen rack is gripped by the transport mechanism and transported downstream.

FIG. 27 is a diagram showing a state in which the specimen rack 2 (first specimen rack) having the one specimen container 1 mounted thereon and the specimen rack 3 (second specimen rack) having a plurality (five) of the specimen containers 1 mounted thereon are successively stopped by the rack stopper 64 in the specimen rack gripping position 157 and FIG. 28 is a diagram showing a state in which only the most downstream first specimen rack 2 is gripped by the transport mechanism 57 and transported downstream.

When, as shown in FIG. 27, the three specimen racks 2 (first specimen racks) or less and the specimen rack 3 (second specimen rack) are successively stopped in the specimen rack gripping position 157, output signals (specimen rack presence/absence information) obtained from the sensors 51, 52 are ON, OFF respectively and output signals (specimen rack presence/absence information) obtained from the sensors 55, 56 are ON, ON respectively. In this case, it is determined that the specimen rack stopped most downstream in the specimen rack gripping position 157 is the specimen rack 2 (first specimen rack) and the specimen rack 2 succeeds and the specimen rack 2 is gripped by determining the gripping width between the gripping plates 57*a* of the transport mechanism 57 by fitting to the width of the specimen rack 2 and setting a closed state.

Then, as shown in FIG. 28, the rack stopper 64 is driven to be turned off and the belt conveyor 60 is released so that only the specimen rack 2 at the head gripped by the transport mechanism 57 is transported on the belt conveyor 61 on the downstream side and the second specimen rack having a width narrower than that of the first specimen rack remains there. If three first specimen racks or less are arranged successively from the head, the first specimen racks arranged successively are all transported downstream and the succeeding second specimen rack remains.

Also, by blocking on the belt conveyor 60 again and operating the belt conveyor 60 again using the rack stopper 64, subsequent specimen racks 3 positioned upstream of the specimen rack gripping position 157 can be stopped and transported by a similar operation. Therefore, by making the width of the transport mechanism 57 equal to that of as many specimen racks as those that can be gripped, only specimen racks that can be gripped by the specimen rack transport mechanism 57 can be moved while leaving those that cannot be gripped on the belt conveyor 60.

Figure 29:
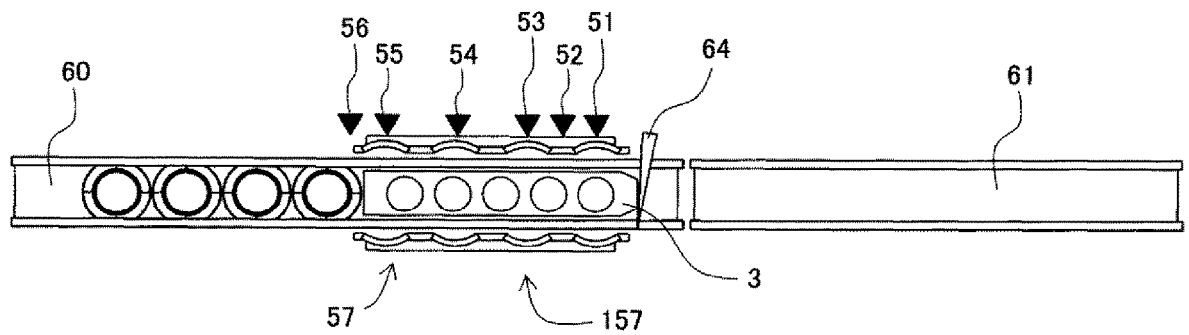
FIG. 29 is a diagram showing a state in which the second specimen rack having a plurality (five) of specimen containers mounted thereon and the specimen racks (first specimen racks), each of which having one specimen container mounted thereon are successively stopped by the rack stopper in the specimen rack gripping position.
Figure 30:
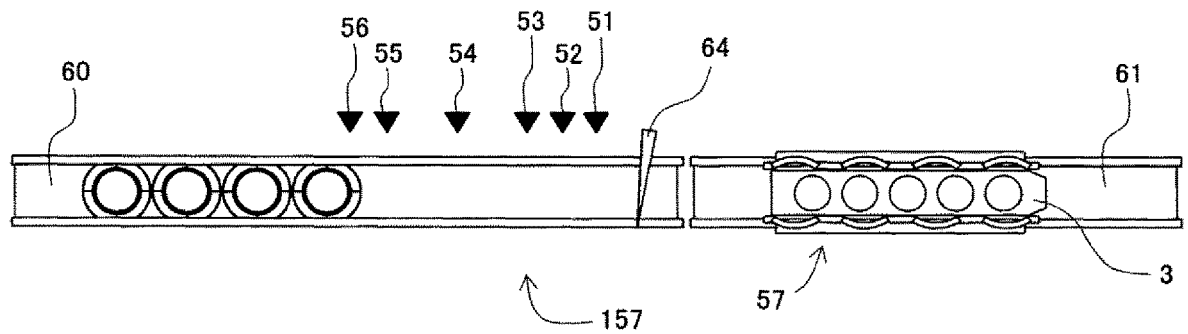
FIG. 30 is a diagram showing a state in which only the most downstream second specimen rack is gripped by the transport mechanism and transported downstream.

FIG. 29 is a diagram showing a state in which the specimen rack 3 (second specimen rack) having a plurality (five) of the specimen containers 1 mounted thereon and the specimen rack 2 (first specimen rack) having the one specimen container 1 mounted thereon are successively stopped by the rack stopper 64 in the specimen rack gripping position 157 and FIG. 30 is a diagram showing a state in which only the most downstream second specimen rack 3 is gripped by the transport mechanism 57 and transported downstream.

When, as shown in FIG. 29, the specimen rack 3 (second specimen rack) and the specimen racks 2 (first specimen racks) are successively stopped in the specimen rack gripping position 157, output signals (specimen rack presence/absence information) obtained from the sensors 51, 52 are ON, ON respectively and output signals (specimen rack presence/absence information) obtained from the sensors 55, 56 are ON, ON respectively. In this case, the specimen rack stopped most downstream in the specimen rack gripping position 157 is determined to be the specimen rack 3 (second specimen rack) and the specimen rack 3 is gripped by determining the gripping width between the gripping plates 57*a* of the transport mechanism 57 by fitting to the width of the specimen rack 3 and setting a closed state.

Then, as shown in FIG. 30, the rack stopper 64 is driven to be turned off and the belt conveyor 60 is released so that only the specimen rack 3 gripped by the transport mechanism 57 is transported on the belt conveyor 61 on the downstream side and the subsequent first specimen racks that are not gripped by the transport plates 57*a* remain there.

Also, by blocking on the belt conveyor 60 again using the rack stopper 64 and operating the belt conveyor 60 again, subsequent specimen racks 3 positioned upstream of the specimen rack gripping position 157 can be stopped and transported by a similar operation.

The effects of the present embodiment configured as described above will be described.

In an automatic analyzer of conventional technology, one or a plurality of specimen containers may be mounted on a specimen rack and transported and when a plurality of types of specimen racks in different shapes is transported, a transport line is needed for each type (shape) of specimen rack, which poses a problem that the structure and control of the automatic analyzer become more complicated, leading to an increase in size of the apparatus and also an increase in cost.

In the present embodiment, by contrast, the specimen racks 2, 3 in the transport path on which the specimen racks 2, 3 are gripped by being sandwiched between the gripping plates 57*a* from both sides of flanks in the transport direction and transported along the transport path and therefore, the plurality of types of specimen racks can be transported while an increase in size of the apparatus and also an increase in cost are suppressed.

Modification of the First Embodiment

A modification of the first embodiment of the present invention will be described with reference to FIGS. 31 to 33.

Figure 31:
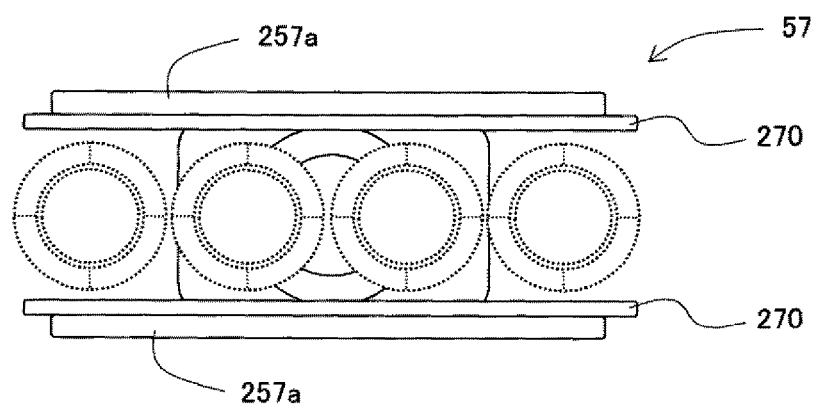
FIG. 31 is a diagram showing the configuration of a gripping plate of a transport mechanism according to a modification of the first embodiment and a diagram showing an open state of the gripping plates of the transport mechanism.
Figure 32:
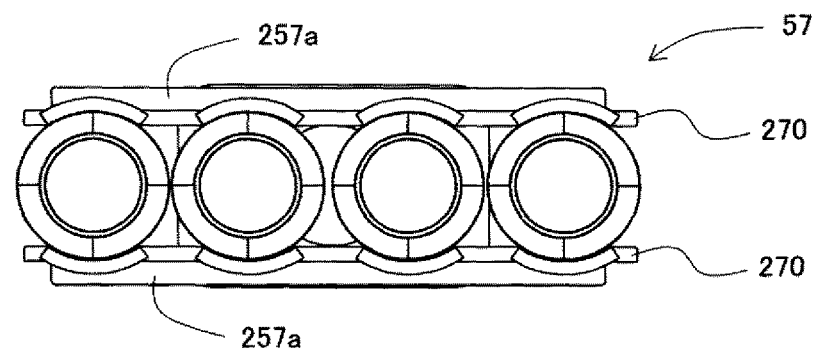
FIG. 32 is a diagram showing the configuration of the gripping plate of the transport mechanism according to the modification of the first embodiment and a diagram showing a closed state in which the first specimen rack is gripped.
Figure 33:
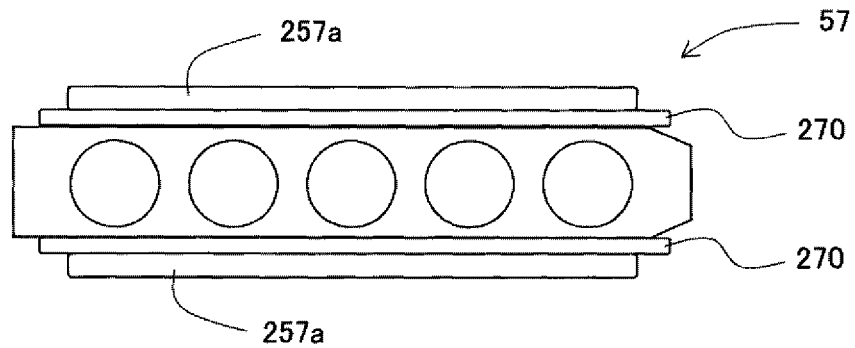
FIG. 33 is a diagram showing the configuration of the gripping plate of the transport mechanism according to the modification of the first embodiment and a diagram showing a closed state in which the second specimen rack is gripped.

FIGS. 31 to 33 are diagrams showing the configuration of gripping plates of the transport mechanism in the present modification, FIG. 31 is a diagram showing an open state of the gripping plates of the transport mechanism, FIG. 32 is a diagram showing a closed state in which the first specimen rack is gripped, and FIG. 33 is a diagram showing a closed state in which the second specimen rack is gripped.

In FIGS. 31 to 33, an elastic body that is deformed by fitting to the shape of the side surface of the first specimen rack 2 or the second specimen rack 3 is arranged on surfaces opposite to each other of gripping plates 257*a* in the present modification. Also, the length in the transport direction of the gripping plate 257*a* is configured to be approximately the same as that of a thinner specimen rack (in the present embodiment, the second specimen rack 3) in the transport direction.

As shown in FIGS. 31 and 32, in an open state in which the specimen racks 2, 3 are released by the gripping plates 257*a* of the transport mechanism 57 (see FIG. 31), the surfaces opposite to each other of the gripping plates 257*a* are flat surfaces, but when the first specimen rack 2 is gripped by the gripping plates 257*a* by the gripping plates 257*a* being changed to a closed state (see FIG. 32), the first specimen rack 2 is sandwiched by the shape of the gripping plates 257*a* being deformed into a curved surface by fitting to the shape of the side surface of the base portion 2*a* of the first specimen rack 2 so that the first specimen rack 2 is held in a stable manner. Also, as shown in FIG. 33, when the second specimen rack 3 is gripped by the gripping plates 257*a* by the gripping plates 257*a* being changed from an open state (see FIG. 31) to a closed state (see FIG. 33), the side surface of the second specimen rack 3 is sandwiched between the gripping plates 257*a* of the flat surface and held in a stable manner.

The other configuration is the same as in the first embodiment.

Also in the present modification configured as described above, effects similar to those in the first embodiment can be obtained.

Also, there is no need to replace gripping plates of the transport mechanism by fitting to the shape of the specimen rack to be used so that efficiency can be improved.

Another Modification of the First Embodiment

Another modification of the first embodiment of the present invention will be described with reference to FIGS. 34 to 36.

Figure 34:
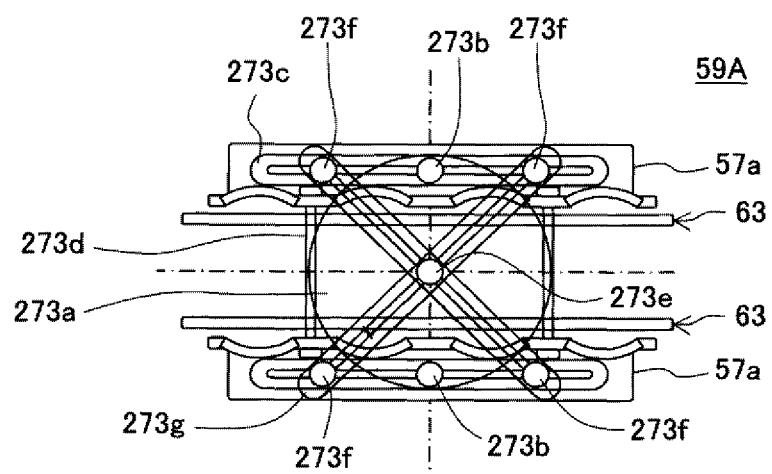
FIG. 34 is a diagram showing the switching structure of a gripping plate in an opening and closing motor of a specimen rack gripping mechanism according to another modification of the first embodiment.
Figure 35:
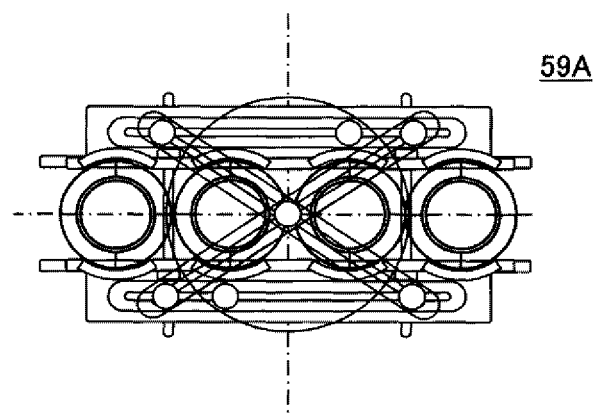
FIG. 35 is a diagram showing an open state of the gripping plates in the opening and closing motor of the specimen rack gripping mechanism according to the other modification of the first embodiment.
Figure 36:
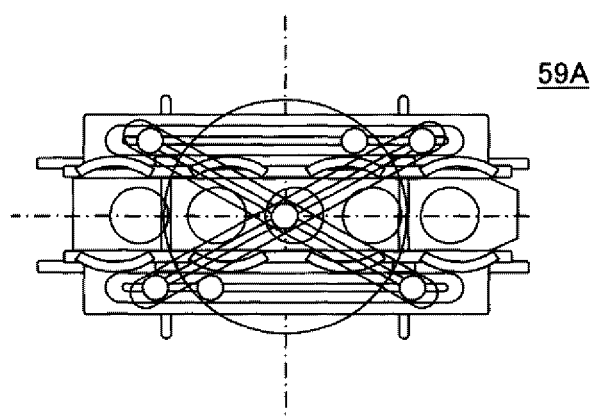
FIG. 36 is a diagram showing a closed state in which the second specimen rack of the gripping plate in the opening and closing motor of the specimen rack gripping mechanism according to the other modification of the first embodiment is gripped.

FIGS. 34 to 36 are diagrams showing a switching structure of the gripping plate 57*a* in the opening and closing motor 67 of the specimen rack gripping mechanism 59 according to the present modification, FIG. 34 is a diagram showing an open state of the gripping plates 57*a*, FIG. 35 is a diagram showing a closed state in which the first specimen rack is gripped, and FIG. 36 is a diagram showing a closed state in which the second specimen rack is gripped.

A switching mechanism of a specimen rack gripping mechanism 59A according to the present modification includes a disk-shaped member 273*a* that is driven to rotate in a horizontal direction by the opening and closing motor 67 using the middle in the transport direction and the width direction of the transport path of the gripping plate 57*a* as a rotation center, a sliding protrusion 273*b* provided on the surface on the side of the gripping plate 57*a* in two positions symmetric with respect to the center of the disk-shaped member 73*a*, a longitudinal guide 273*c* provided on the gripping plate 57*a* along the transport path to guide movement in the transport direction of the sliding protrusion 273*b*, a transverse guide 273*d* that guides movement in the width direction of the transport path of the gripping plate 57*a*, and two bar members 273*g* rotatably provided around a center 273*e* of the disk-shaped member 273*a*. The two bar members 273*g* having the same length are arranged so as to cross in the center 273*e* of the disk-shaped member 273*a* in the center portion thereof and a sliding protrusion 273*f* that moves along the longitudinal guide 273*c* of the gripping plate 57*a* is provided on both ends of each.

The first specimen rack 2 and the second specimen rack 3 are gripped by the gripping plates 57*a* by the disk-shaped member 273*a* being driven to rotate by the opening and closing motor 67 from an open state (see FIG. 34) in which the specimen racks 2, 3 are released from the gripping plates 57*a* of the transport mechanism 57 and the gripping plate 57*a* having the longitudinal guide 273*c* that guides movement of the sliding protrusion 273*b* being moved in the width direction of the transport path while being guided by the transverse guide 273*d* with an approaching relative position of the sliding protrusion 273*b* in the width direction of the transport path (see FIGS. 35 and 36). At this point, parallel properties of the gripping plates 57*a* are maintained by the two bar members 273*g*. That is, the gripping plate 57*a* can be driven to open or close by changing the rotating direction of the opening and closing motor 67. Also, by changing the rotation angle of the disk-shaped member 273*a* by the opening and closing motor 67, the distance (opening and closing distance) between the gripping plates 57*a* can be controlled.

The other configuration is the same as in the first embodiment.

Also in the present modification configured as described above, effects similar to those in the first embodiment can be obtained.

Second Embodiment

A second embodiment of the present invention will be described with reference to FIGS. 37 to 49. In the figures, the same reference signs are attached to members similar to those in the first embodiment and a description thereof is omitted.

FIG. 1 is a diagram diagrammatically showing an overall configuration of an automatic analyzer according to the present embodiment and FIG. 2 is a diagram diagrammatically showing the configuration of an analysis module together with a peripheral configuration of the automatic analyzer.

Figure 37:
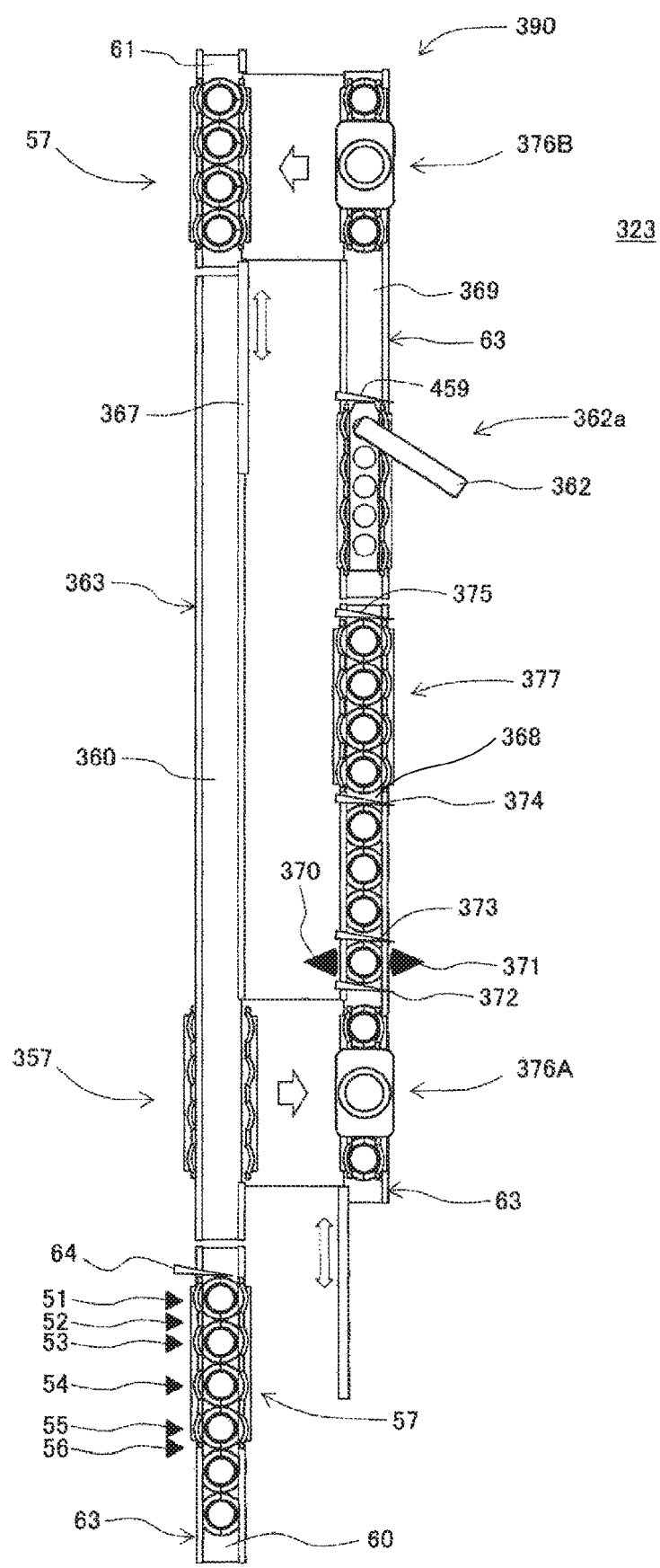
FIG. 37 is a top view schematically showing main components of a transport device according to a second embodiment.
Figure 38:
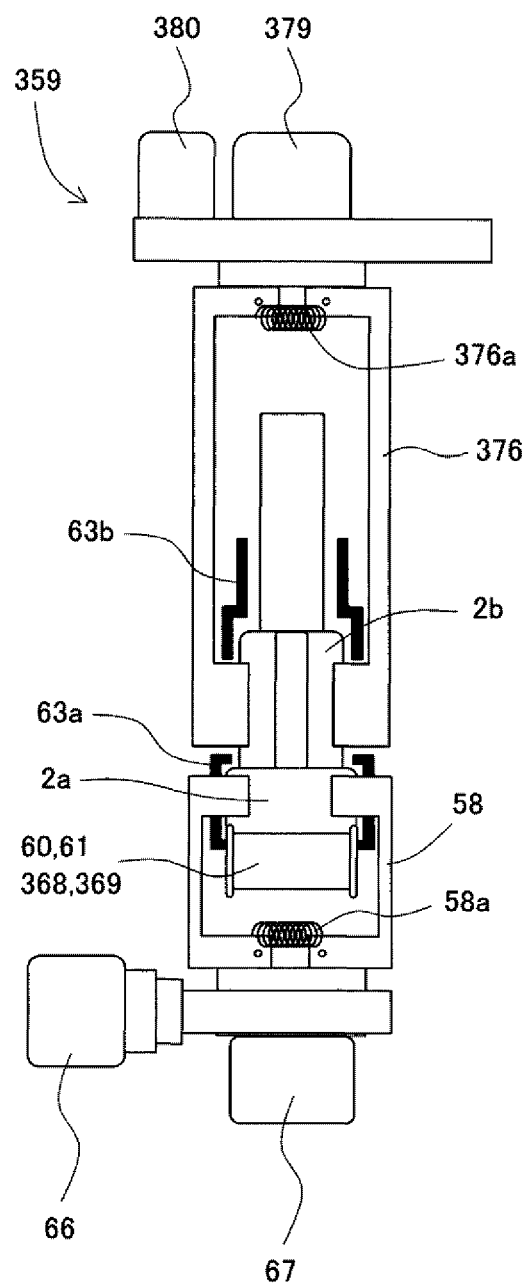
FIG. 38 is a diagram diagrammatically showing the configuration of the transport mechanism of the transport device when transporting a first specimen rack.

FIG. 37 is a top view schematically showing main components of a transport device according to the present embodiment. FIG. 38 is a diagram diagrammatically showing the configuration of the transport mechanism of the transport device when a first specimen rack is transported and FIG. 39 is a diagram diagrammatically showing the configuration of the transport mechanism of the transport device when a second specimen rack is transported.

Figure 39:
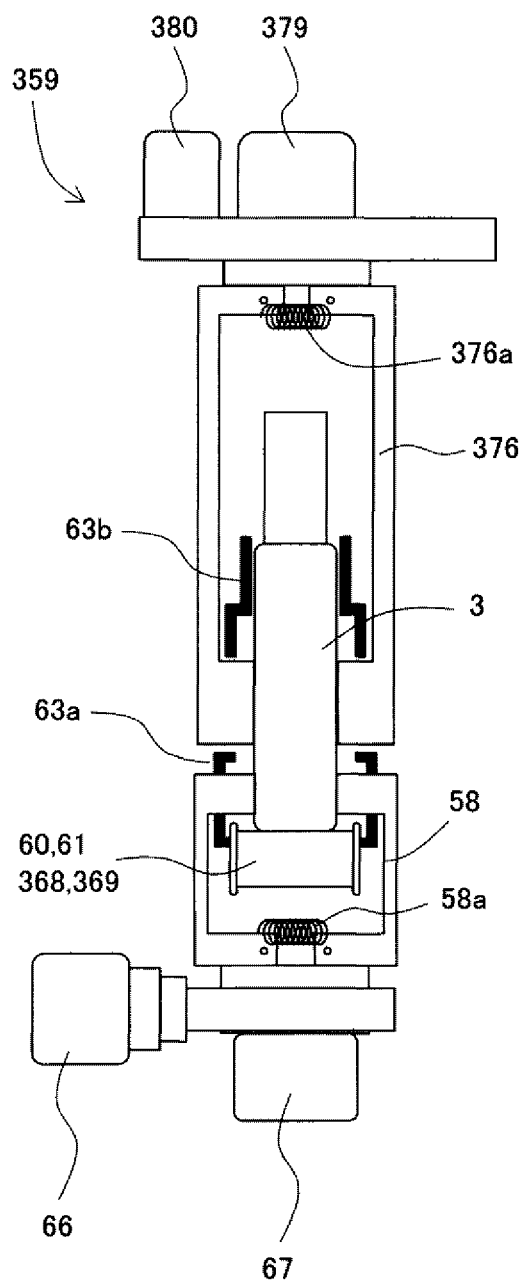
FIG. 39 is a diagram diagrammatically showing the configuration of the transport mechanism of the transport device when transporting a second specimen rack.

In FIGS. 37 and 39, a transport device 323 according to the present embodiment is roughly constructed of belt conveyors 60, 61 longitudinally arranged along a transport path that transports specimen racks 2, 3 on which a specimen container 1 is mounted, a specimen rack transport path 360 longitudinally connected between the belt conveyors 60, 61, a rack stopper 64 provided in a specimen rack gripping position 157 arranged on the belt conveyor 60, a plurality of sensors 51 to 56 that detects the presence/absence of the specimen racks 2, 3 in the specimen rack gripping position 157, a transport mechanism 57 that grips the specimen racks 2, 3 in the specimen rack gripping position 157 to transport along a specimen rack transport path 363, belt conveyors 368, 369 longitudinally arranged along the specimen rack transport path 360 as a second transport path, guide members 63, 363 arranged on both sides of the belt conveyors 60, 61, 368, 369 and the specimen rack transport path 360, rack stoppers 372 to 375 provided on the belt conveyor 368, a retracting transport mechanism 376A that transports the specimen racks 2, 3 between a specimen rack retracting position 357 of the specimen rack transport path 360 and the belt conveyor 368, a RFID reader 370 and a bar code reader 371 that reads RFID and bar code attached to the specimen rack 2 held by the stopper 373 respectively, a retracting transport mechanism 376B that transports the specimen racks 2, 3 between the belt conveyor 369 and the belt conveyor 61, a dispensing probe 362 provided in a specimen dispensing position 362*a* arranged on the belt conveyor 369 to dispense a specimen from the specimen container 1 mounted on the specimen racks 2, 3, a rack stopper 459, shutters 366, 367 that block the transport path of the specimen racks 2, 3 by the retracting transport mechanisms 376A, 376B, and a transport mechanism 377 that transports the specimen racks 2, 3 along the belt conveyor 368, 369.

The belt conveyors 60, 61, 368, 369 are driven by a drive mechanism (not shown) such that the specimen racks 2, 3 arranged on the belt conveyors 60, 61 are transported toward the downstream side of the transport path.

The transport mechanism 57, 377 includes a specimen rack gripping mechanism 59 that grips the specimen racks 2, 3 in the specimen rack gripping position 157 using the gripping plates 57*a* from both sides of flanks in the transport direction to transport along the transport path and a specimen rack transport mechanism axis drive motor 66 that drives the specimen rack gripping mechanism 59 along the transport path.

The specimen rack gripping mechanism 59 includes two gripping plates 57*a*, an arm 58 that holds each of the gripping plates 57*a* from both sides below, a spring 58*a* that energizes the arm 58 in the direction of an open state of the gripping plates 57*a* (that is, in the direction in which the distance between the gripping plates 57*a* increases), and an opening and closing motor 67 that drives to open or close the gripping plates 57*a* by driving the arm 58. The opening and closing motor 67 is controlled by a general management computer 28 and controls the distance between the gripping plates 57*a* of the specimen rack gripping mechanism 59 in accordance with the width of the specimen racks 2, 3.

The retracting transport mechanisms 376A, 376B include a specimen rack gripping mechanism 359 that grips the specimen racks 2, 3 using the gripping plates 357*a* from both sides of flanks in the transport direction to transport along the transport path and a specimen rack transport mechanism axis drive motor 380 that drives the specimen rack gripping mechanism 359 in a direction along the transport path and the width direction.

The specimen rack gripping mechanism 359 includes two gripping plates 357*a*, an arm 376 that holds each of the gripping plates 357*a* from both sides above, a spring 376*a* that energizes the arm 376 in the direction of an open state of the gripping plates 357*a* (that is, in the direction in which the distance between the gripping plates 357*a* increases), and an opening and closing motor 379 that drives to open or close the gripping plates 357*a* by driving the arm 376. The opening and closing motor 379 is controlled by the general management computer 28 and controls the distance between the gripping plates 357*a* of the specimen rack gripping mechanism 359 in accordance with the width of the specimen racks 2, 3.

The guide member 63, 363 includes a first guide member 63*a* provided along the transport path on both sides of the transport path to guide movement in the transport direction while limiting movement in the width direction of the specimen container holding portion 2*b* of the first specimen rack 2 and a second guide member 63*b* provided along the transport path on both sides of the transport path above the top end of the specimen container holding portion 2*b* of the first specimen rack 2 to guide movement in the transport direction while limiting movement in the width direction of the specimen container holding portion 3*a* of the second specimen rack 3. In the present embodiment, a configuration having two stages of guide, an upper guide (the second guide member 63*b*) and a lower guide (the first guide member 63*a*), is shown, but the present embodiment is not limited to such an example and the guide function of specimen racks may further be improved by providing a plurality of stages of three stages or more by fitting to the shape of the specimen rack to be transport symmetric.

Figure 40:
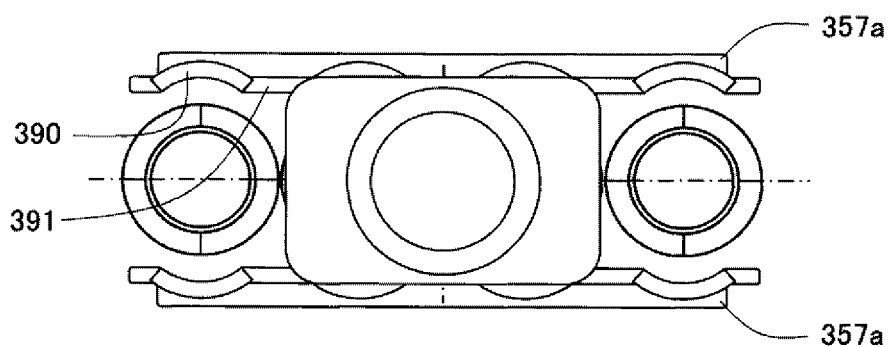
FIG. 40 is a diagram showing the configuration of a gripping plate of a retracting transport mechanism and a diagram showing an open state of the gripping plates of the transport mechanism.
Figure 41:
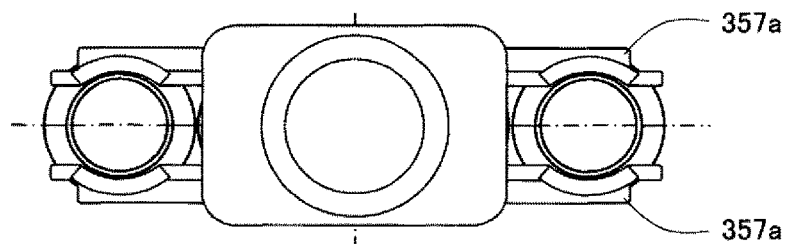
FIG. 41 is a diagram showing the configuration of the gripping plate of the retracting transport mechanism and a diagram showing a closed state in which the first specimen rack is gripped.

FIGS. 40 and 41 are diagrams showing the configuration of gripping plates of a retracting transport mechanism, FIG. 40 is a diagram showing an open state of the gripping plates of the transport mechanism, and FIG. 41 is a diagram showing a closed state in which a first specimen rack is gripped.

As shown in FIGS. 40 and 41, the gripping plate 357*a* has a configuration approximately the same as that of the gripping plate 57*a* and a curved surface portion 390 formed along a side surface shape of a specimen container holding portion 2*b* of the first specimen rack 2 and arranged equidistantly in the transport direction and a flat surface portion 391 formed along a side surface shape of the second specimen rack 3 and arranged between curved surface portions in the transport direction are provided on surfaces opposite to each other of the gripping plates 357*a*. The length in the transport direction of the gripping plate 357*a* is configured to be approximately the same as that of a thinner specimen rack (in the present embodiment, the second specimen rack 3) in the transport direction.

When the first specimen rack 2 is gripped by the gripping plates 357*a* by the gripping plates 357*a* of the retracting transport mechanism 376A, 376B being changed from an open state (see FIG. 40) in which the specimen racks 2, 3 are released to a closed state, the side surface of the specimen container holding portion 2*b* of the first specimen rack 2 is sandwiched between the curved surface portions 390 of the gripping plates 357*a* on both sides of the transport path and held in a stable manner (see FIG. 41). Though not shown, when the second specimen rack 3 is gripped by the gripping plates 357*a* of the retracting transport mechanism 376A, 376B by the gripping plates 357*a* being changed from an open state (see FIG. 40) in which the specimen racks 2, 3 are released to a closed state, the side surface of the second specimen rack 3 is sandwiched between the flat surface portions 391 of the gripping plates 357*a* on both sides of the transport path and held in a stable manner.

FIGS. 42 to 49 are flow charts showing the flow of the transport process of a specimen rack by a transport device according to the present embodiment.

Figure 42:
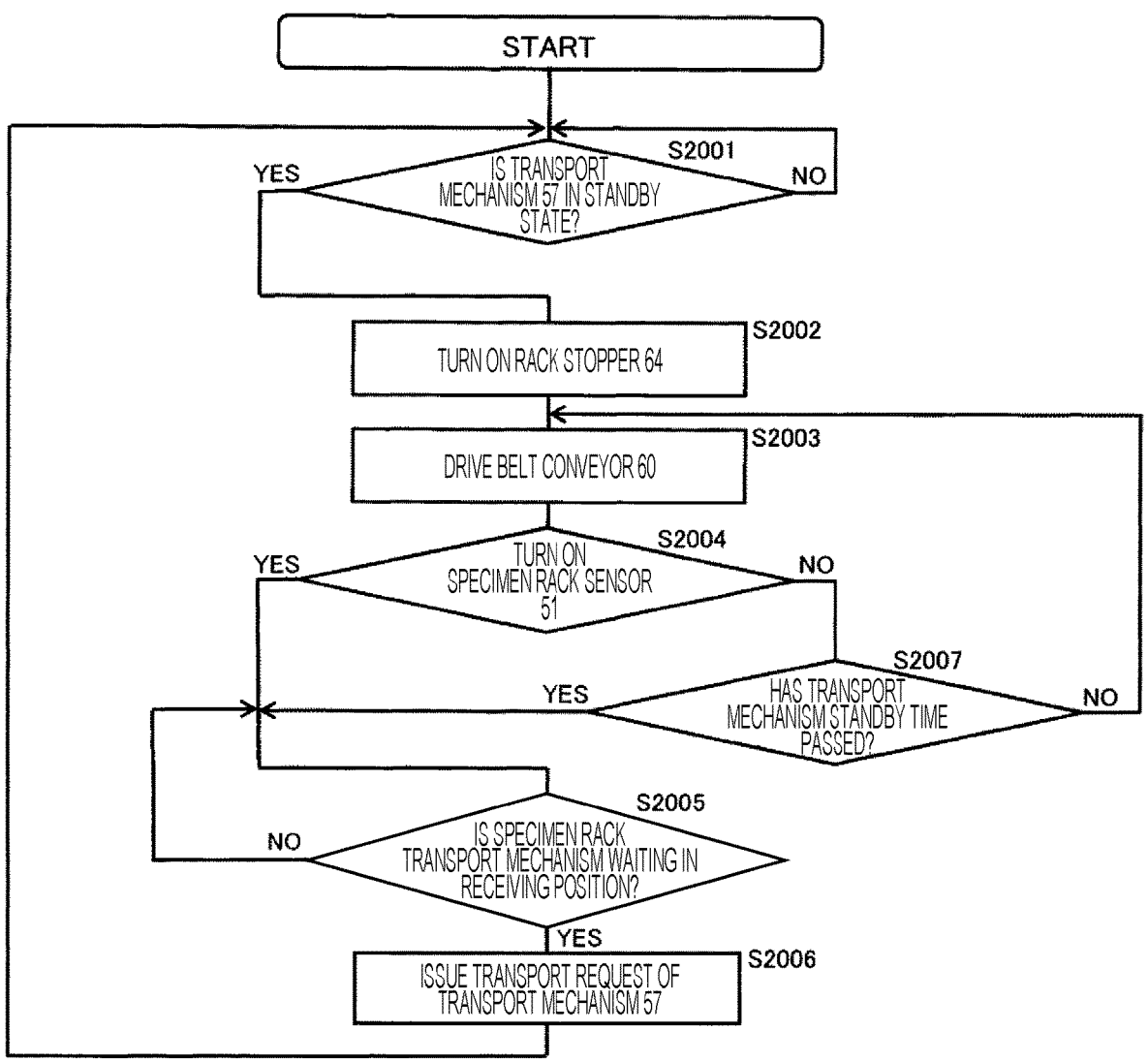
FIG. 42 is a flow chart diagrammatically showing the specimen rack transport request process of the transport process.

FIG. 42 is a flow chart diagrammatically showing a specimen rack transport request process of the transport process.

In the specimen rack transport request process of the transport process, as shown in FIG. 42, the general management computer 28 first determines whether the transport mechanism 57 is in a standby state (state of not being driven) (step S2001) and if the determination result is NO, repeats the determination in step S2001 until the determination result becomes YES. If the determination result in step S2001 is YES, the general management computer 28 turns on the rack stopper 64 to block movement of the specimen racks 2, 3 on the belt conveyor 60 (step S2002) and drives the belt conveyor 60 (step S2003). Subsequently, the general management computer 28 determines whether the sensor 51 is ON (step S2004) and if the determination result is ON, determines whether a preset transport mechanism standby time has passed (step S2007). If the determination result in step S2007 is NO, the general management computer 28 returns to the process in step S2003. If the determination result in step S2004 is YES or the determination result in step S2007 is YES, the general management computer 28 determines whether the transport mechanism 57 is waiting in the specimen rack gripping position 157 (step S2004). If the determination result in step S2005 is YES, the general management computer 28 issues a specimen rack transport request to transport the specimen racks 2, 3 in the specimen rack gripping position 157 to the transport mechanism 57 (step S2006) and then, returns to the process in step S2001. If the determination result in step S2006 is NO, the general management computer 28 repeats the determination in step S2006 until the determination result becomes YES.

Figure 43:
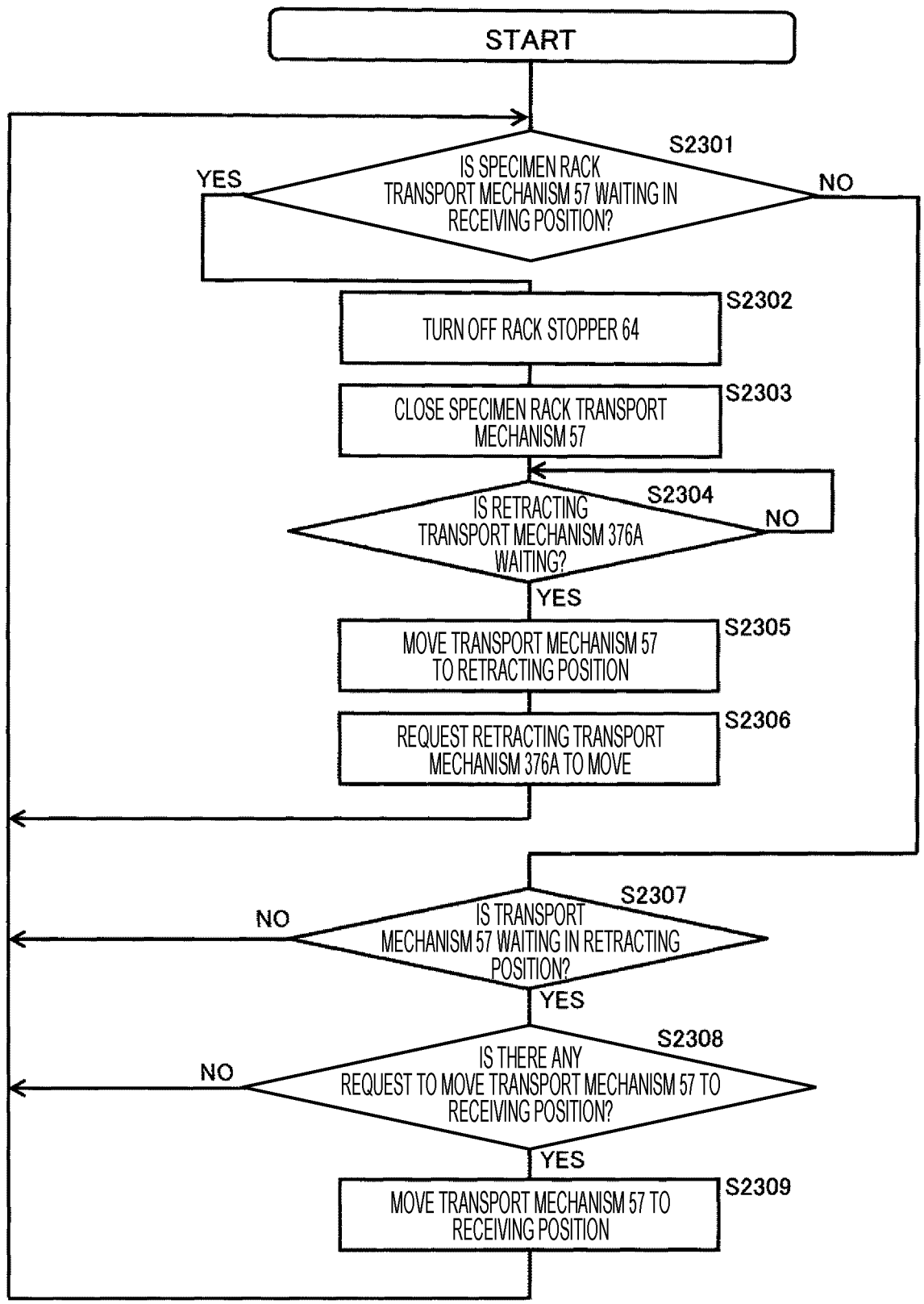
FIG. 43 is a flow chart diagrammatically showing a transport mechanism movement process of the transport process.

FIG. 43 is a flow chart diagrammatically showing a transport mechanism movement process of the transport process.

In the transport mechanism movement process of the transport process, as shown in FIG. 43, the general management computer 28 first determines whether the transport mechanism 57 is waiting in the receiving position of the specimen racks 2, 3 (step S2301) and if the determination result is YES, turns off the rack stopper 64 (step S2302) and closes the transport mechanism 57 to hold the specimen racks 2, 3 (step S2303). Subsequently, the general management computer 28 determines whether the retracting transport mechanism 376A is waiting (step S2304) and if the determination result is NO, waits until the determination result becomes YES and if the determination result is YES, moves the transport mechanism 57 to a retracting position (step S2305) and issues a movement request of the retracting transport mechanism 376A (step S2306) before returning to the process in step S2301. If the determination result in step S2301 is NO, the general management computer 28 determines whether the transport mechanism 57 is waiting in the retracting position (step S2307) and determines whether any movement request to the receiving position of the transport mechanism 57 has been issued (step S2308). The general management computer 28 returns to the process of step S2301 if the determination result of step S2307 or S2308 is NO and moves the transport mechanism 57 to the receiving position (step S2309) before returning to the process in step S2301 if the determination results of both steps S2307, S2308 are YES.

Figure 44:
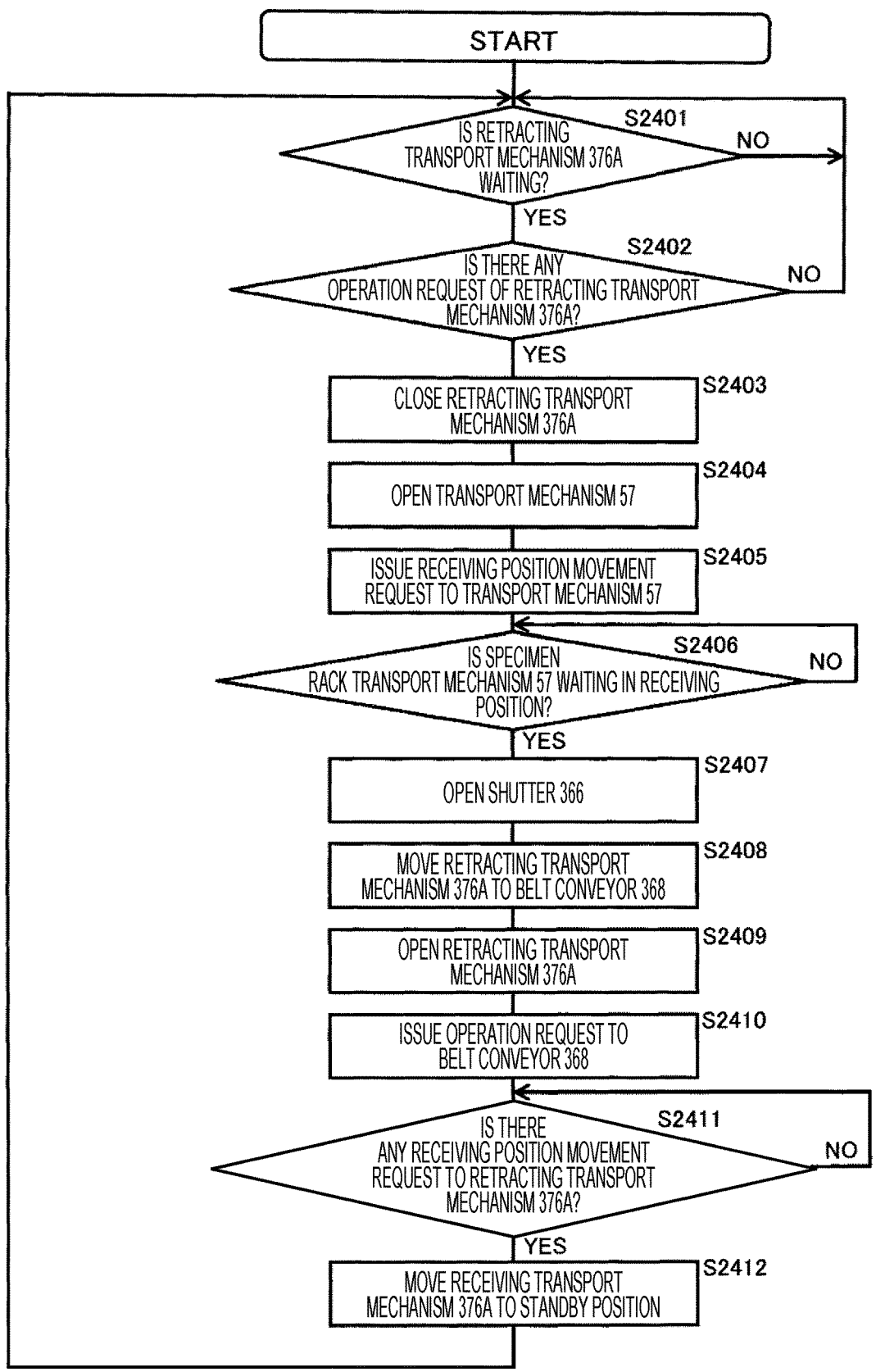
FIG. 44 is a flow chart diagrammatically showing a retracting transport mechanism movement process of the transport process.

FIG. 44 is a flow chart diagrammatically showing a retracting transport mechanism movement process of the transport process.

In the retracting transport mechanism movement process of the transport process, as shown in FIG. 44, the general management computer 28 first determines whether the retracting transport mechanism 376A is waiting (step S2401) and determines whether an operation request has been issued to the retracting transport mechanism 376A (step S2402). If the determination result one of steps S2401, S2402 is NO, the general management computer 28 repeats the processes in steps S2401, S2402 until both determination results become YES. If the determination results of both steps S2401, S2402 are YES, the general management computer 28 closes the retracting transport mechanism 376A (step S2403), open the transport mechanism 57 (step S2404), and issues a movement request to the receiving position to the transport mechanism 57 (step S2405). Subsequently, the general management computer 28 determines whether the transport mechanism 57 is in a standby state in the receiving position (step S2406) and if the determination result is NO, repeats the process in step S2406. If the determination result in step S2406 is YES, the general management computer 28 opens the shutter 366 (step S2407), moves the retracting transport mechanism 376A to the belt conveyor 368 (step S2408), opens the retracting transport mechanism 376A (step S2409), and issue an operation request of the belt conveyor 368 (step S2410). Subsequently, the general management computer 28 determines whether a movement request to the receiving position of the retracting transport mechanism 376A has been issued (S2411) and if the determination result is NO, repeats the determination process in step S2411. If the determination result in step S2411 is YES, the general management computer 28 moves the retracting transport mechanism 376A to the standby position (step S2412) before returning to the process in step S2401.

Figure 45:
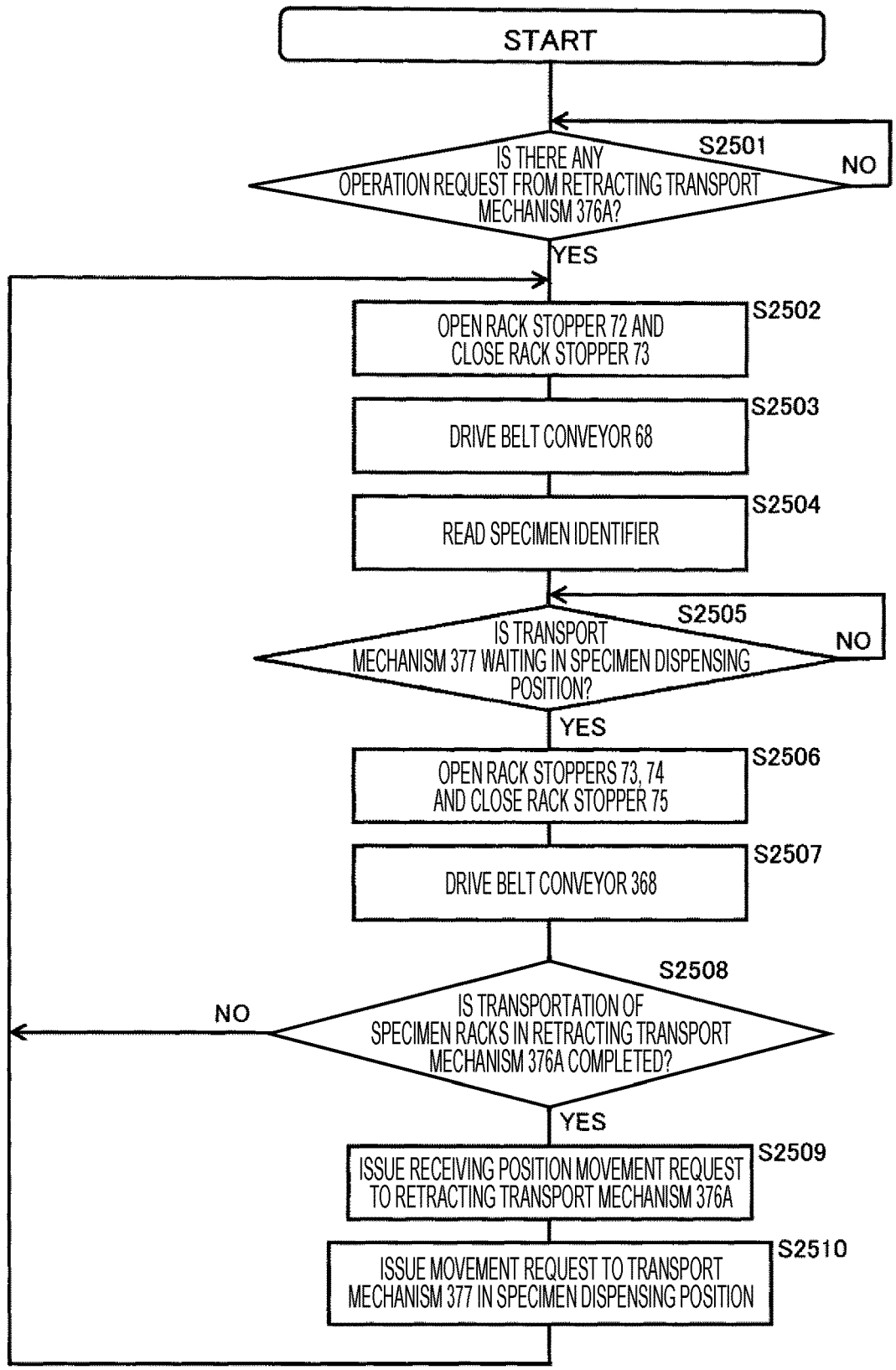
FIG. 45 is a flow chart diagrammatically showing a belt conveyor drive process of the transport process.

FIG. 45 is a flow chart diagrammatically showing a belt conveyor drive process of the transport process.

In the belt conveyor drive process of the transport process, as shown in FIG. 45, the general management computer 28 first determines whether any operation request of the retracting transport mechanism 376A has been issued (step S2501) and if the determination result is NO, repeats the process in step S2501. If the determination result in step S2501 is YES, the general management computer 28 opens the rack stopper 372 and closes the rack stopper 373 (step S2502). Subsequently, the general management computer 28 drives the belt conveyor 368 (step S2503) and reads the specimen identifier (specimen ID) of the specimen container 1 (step S2504). Next, the general management computer 28 determines whether the transport mechanism 377 is waiting in the specimen dispensing position 362a (step S2505) and if the determination result is NO, repeats the process in step S2505. If the determination result in step S2505 is YES, the general management computer 28 opens the rack stoppers 373, 374 and also closes the rack stopper 375 (step S2507) and drives the belt conveyor 368 (step S2508). Subsequently, the general management computer 28 determines whether the specimen racks 2, 3 of the retracting transport mechanism 376A have all been unloaded (S2508) and if the determination result is NO, returns to the process in step S2502. If the determination result in step S2508 is YES, the general management computer 28 issues a movement request to the receiving position to the retracting transport mechanism 376A (step S2509) and issues a movement request to the receiving position to the transport mechanism 377 (step S2510) before returning to the process in step S2502.

Figure 46:
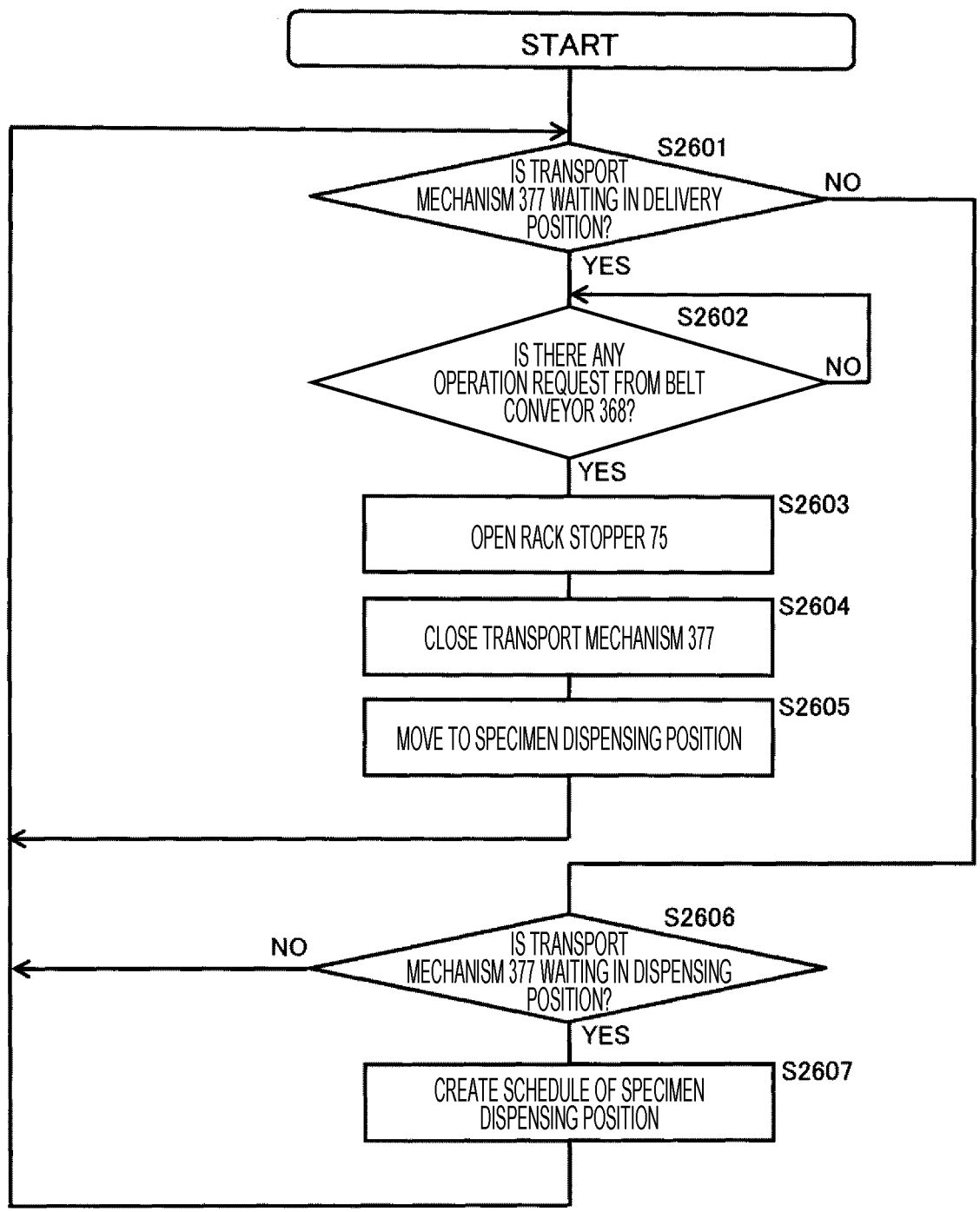
FIG. 46 is a flow chart diagrammatically showing the belt conveyor drive process of the transport process.

FIG. 46 is a flow chart diagrammatically showing a belt conveyor drive process of the transport process.

In the specimen rack movement process of the transport process, as shown in FIG. 46, the general management computer 28 first determines whether the transport mechanism 377 is waiting in a delivery position (step S2601) and if the determination result is YES, determines whether an operation request of the belt conveyor 368 has been issued (step S2602). If the determination result in step S2602 is NO, the general management computer 28 repeats the process in step S2602. If the determination result in step S2602 is YES, the general management computer 28 opens the rack stopper 375 (step S2603), closes the transport mechanism 377 (step S2604), and moves the transport mechanism 377 to the specimen dispensing position 362a (step S2605) before returning to the process in step S2601. If the determination result in step S2601 is NO, the general management computer 28 determines whether the transport mechanism 377 is waiting in the dispensing position (step S2606) and if the determination result is NO, returns to the process in step S2601. If the determination result in step S2606 is YES, the general management computer 28 creates a specimen dispensing position schedule (step S2607) before returning to the process in step S2601.

Figure 47:
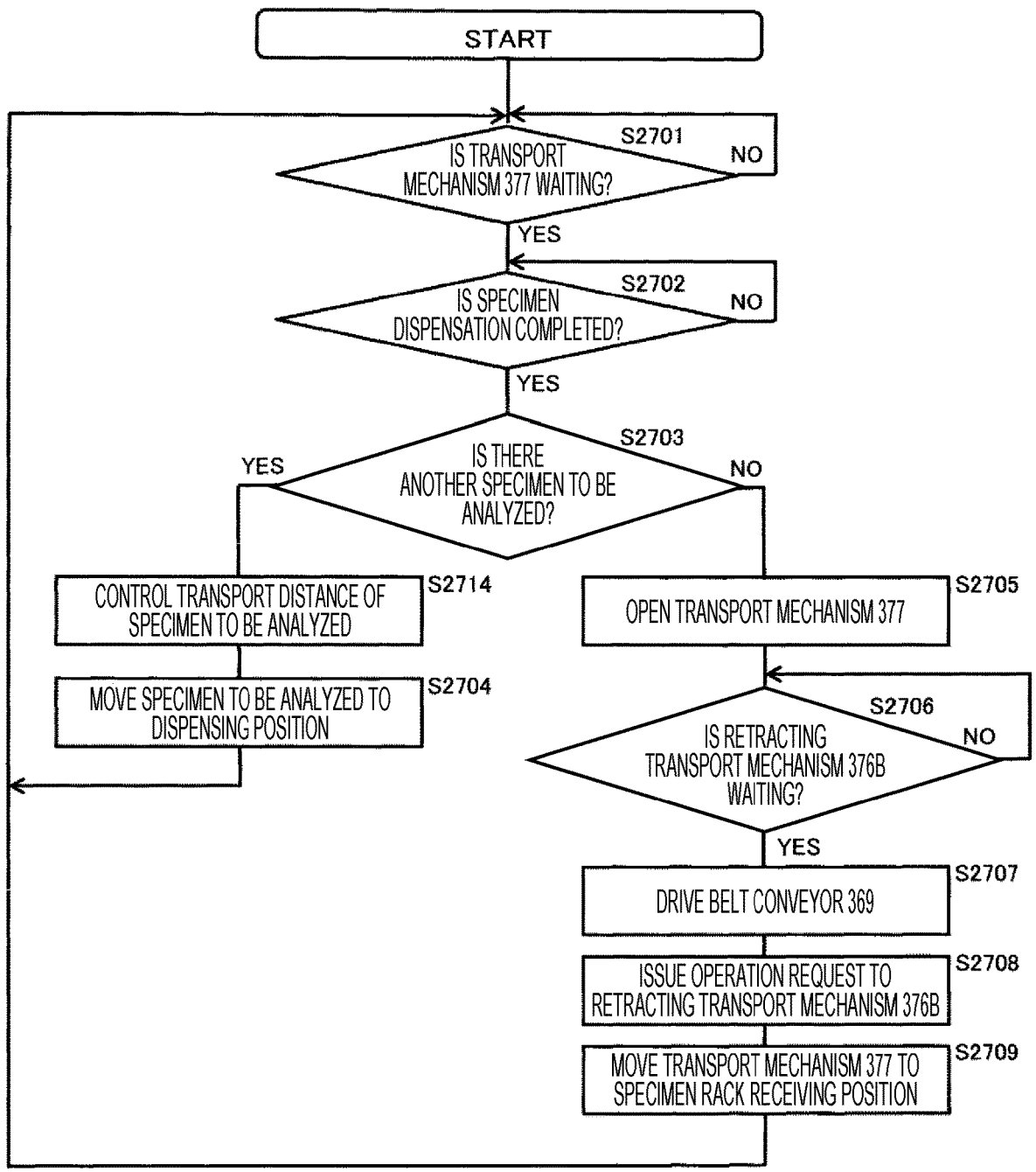
FIG. 47 is a flow chart diagrammatically showing a transport mechanism drive process in a dispensing position of the transport process.

FIG. 47 is a flow chart diagrammatically showing a transport mechanism drive process in the dispensing position of the transport process.

In the transport mechanism drive process in the dispensing position of the transport process, as shown in FIG. 47, the general management computer 28 first determines whether the transport mechanism 377 is in a standby state (step S2701) and if the determination result is NO, repeats the process in step S2701. If the determination result in step S2701 is YES, the general management computer 28 determines whether the dispensing process of the specimen container 1 is completed (step S2702) and if the determination result is NO, repeats the process in step S2702. If the determination result in step S2702 is YES, the general management computer 28 determines whether there is any other specimen to be dispensed (that is, a specimen to be analyzed) (step S2703) and if the determination result is YES, calculates a moving distance in accordance with the specimen container fixed by the transport mechanism 377 (step S2714) and moves the specimen container 1 containing the specimen to be analyzed to the dispensing position 362a in accordance with the calculation result in step S2714 (step S2704) before returning to the process in step S2701. If the determination result in step S2703 is NO, the general management computer 28 opens the transport mechanism 57 (step S2705) and determines whether the retracting transport mechanism 376B is in a standby state (step S2706). If the determination result in step S2706 is NO, the general management computer 28 repeats the process in step S2706. If the determination result in step S2706 is YES, the general management computer 28 drives the belt conveyor 369 (step 2707), issues an operation request of the retracting transport mechanism 376B (step S2708), and moves the transport mechanism 377 to the receiving position of the specimen racks 2, 3 (step S2709) before returning to the process in step S2701.

Figure 48:
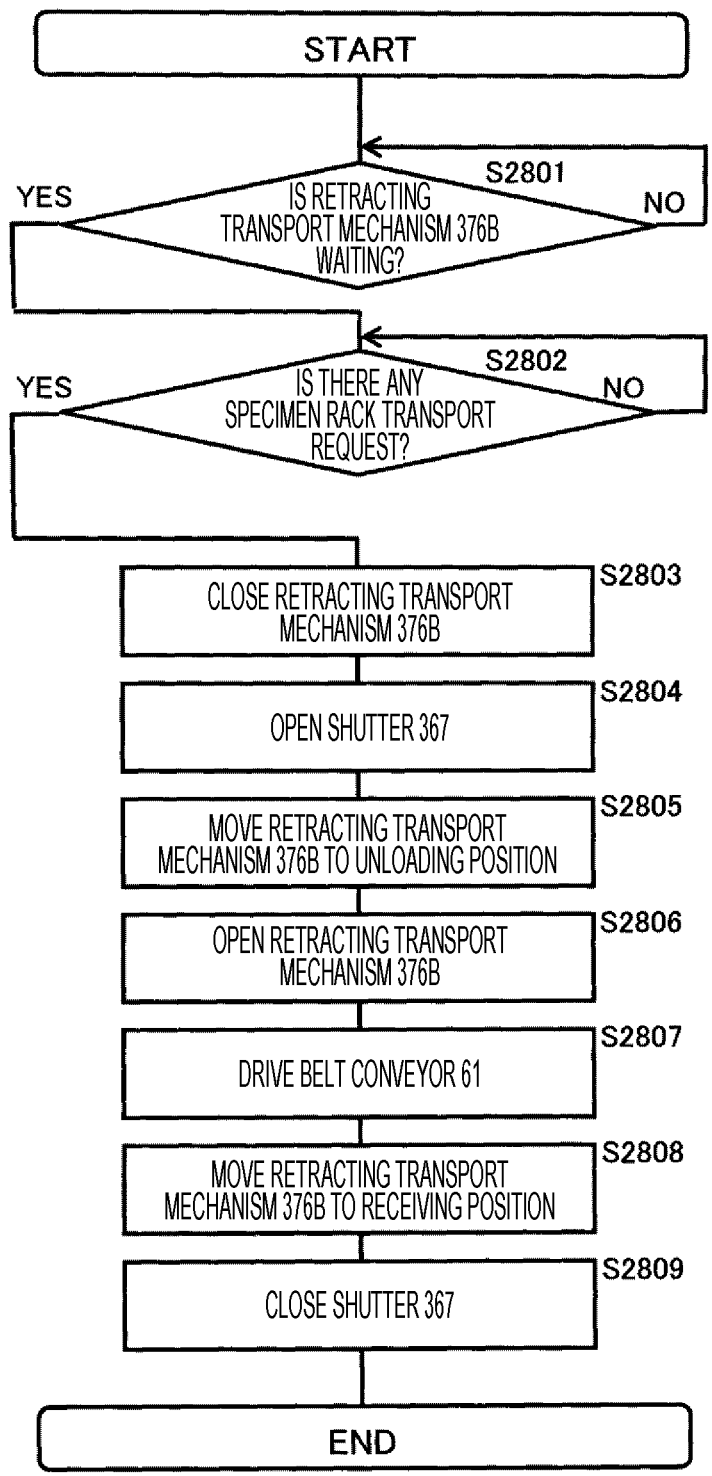
FIG. 48 is a flow chart diagrammatically showing a retracting transport mechanism drive process of the transport process.

FIG. 48 is a flow chart diagrammatically showing a retracting transport mechanism drive process of the transport process.

In the retracting transport mechanism drive process of the transport process, as shown in FIG. 48, the general management computer 28 first determines whether the retracting transport mechanism 376B is in a standby state (step S2801) and if the determination result is NO, repeats the process in step S2801. If the determination result in step S2801 is YES, the general management computer 28 determines whether any unload request of the specimen racks 2, 3 has been issued (step S2802) and if the determination result is NO, repeats the process in step S202. If the determination result in step S2802 is YES, the general management computer 28 closes the retracting transport mechanism 376B (step S2803), opens the shutter 367 (step S2804), moves the retracting transport mechanism 376B to an unloading position (step S2805), opens the retracting transport mechanism 376B (step S2806), transports the specimen rack to the next analysis module by driving the belt conveyor 61 (step S2807), moves the retracting transport mechanism 376B to the receiving position (step S2808), and closes the shutter 367 (step S2809) before terminating the process. Incidentally, in steps S2802, S2803, information that allows to determine the shape of the specimen rack is received together with any operation request received from the belt conveyor 61 and the specimen rack is fixed by determining the gripping width fitting to the shape of the specimen rack and closing the retracting transport mechanism 376B.

Figure 49:
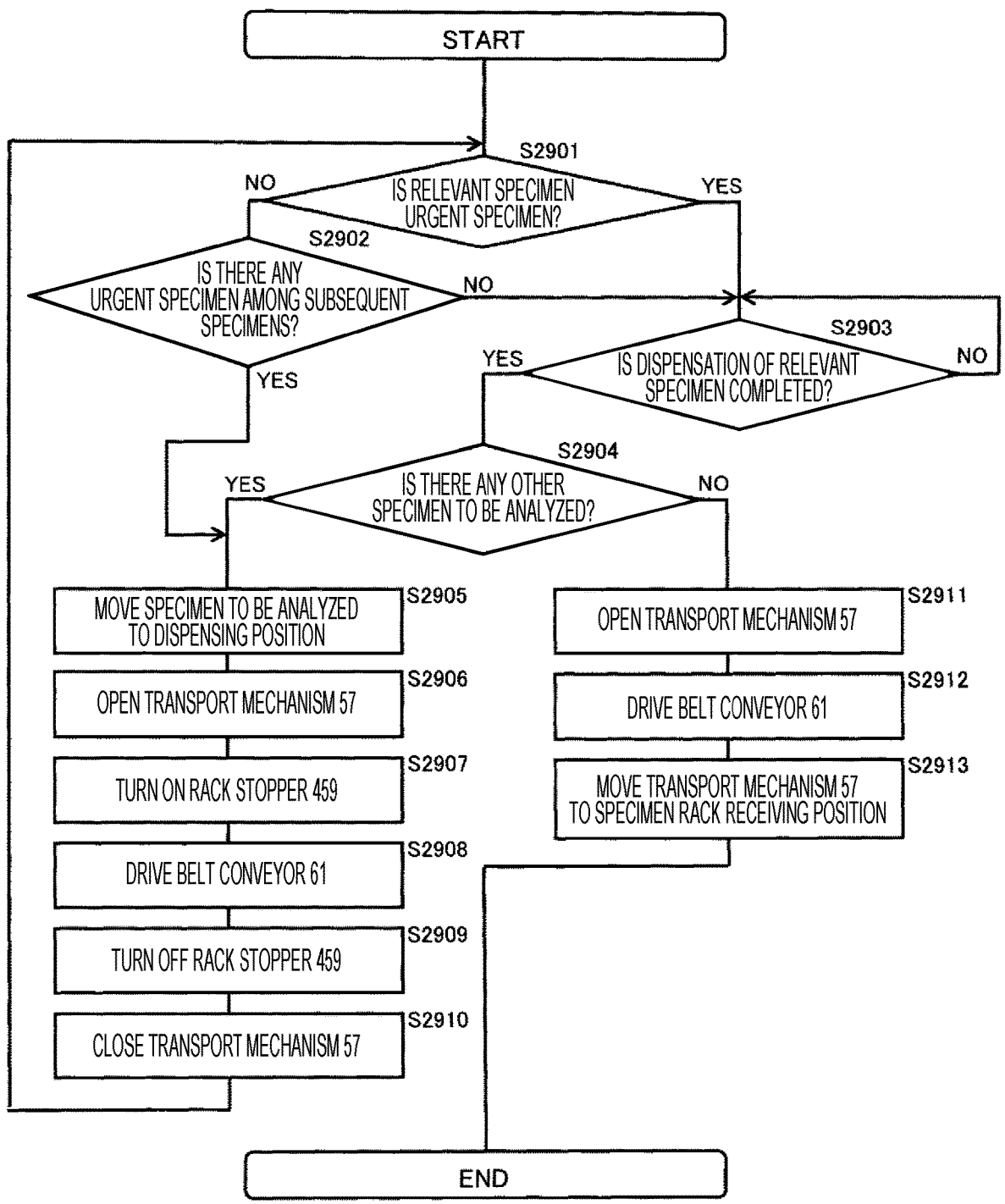
FIG. 49 is a flow chart diagrammatically showing an analysis process.

FIG. 49 is a flow chart diagrammatically showing an analysis process.

In the analysis process, as shown in FIG. 49, the general management computer 28 first determines whether the specimen be analyzed is an urgent specimen (step S2901) and if the determination result is YES, determines whether dispensation of the specimen is completed (step S2903). If the determination result in step S2903 is NO, the general management computer 28 repeats the process in step S2903. If the determination result in step S2903 is YES, the general management computer 28 determines whether there is any other specimen to be analyzed (step S2904) and if the determination result is YES, moves the specimen to be analyzed to the dispensing position (step S2905), opens the transport mechanism 57 (step S2906), turns on the rack stopper 459 (step S2907), drives the belt conveyor 61 (step S2908), turns off the rack stopper 459 (step S2909), and closes the transport mechanism 57 (step S2910) before returning to the process in step S2901. If the determination result in step S2904 is NO, the general management computer 28 opens the transport mechanism 57 (step S2911), drives the belt conveyor 61 (step S2912), and moves the transport mechanism 57 to the receiving position of the specimen rack (step S2913) before terminating the process. If the determination result in step S2901 is NO, the general management computer 28 determines whether there is any subsequent urgent specimen (step S2902) and if the determination result is YES, proceeds to the process in step S2905 and if the determination result is NO, proceeds to the process in step S2903.

The other configuration is the same as in the first embodiment.

Also in the present embodiment configured as described above, effects similar to those in the first embodiment can be obtained.

Modification of the Second Embodiment

A modification of the second embodiment of the present invention will be described with reference to FIG. 50.

The present modification shows a case when the transport direction of the specimen racks 2, 3 is changed by a retracting transport mechanism 476.

Figure 50:
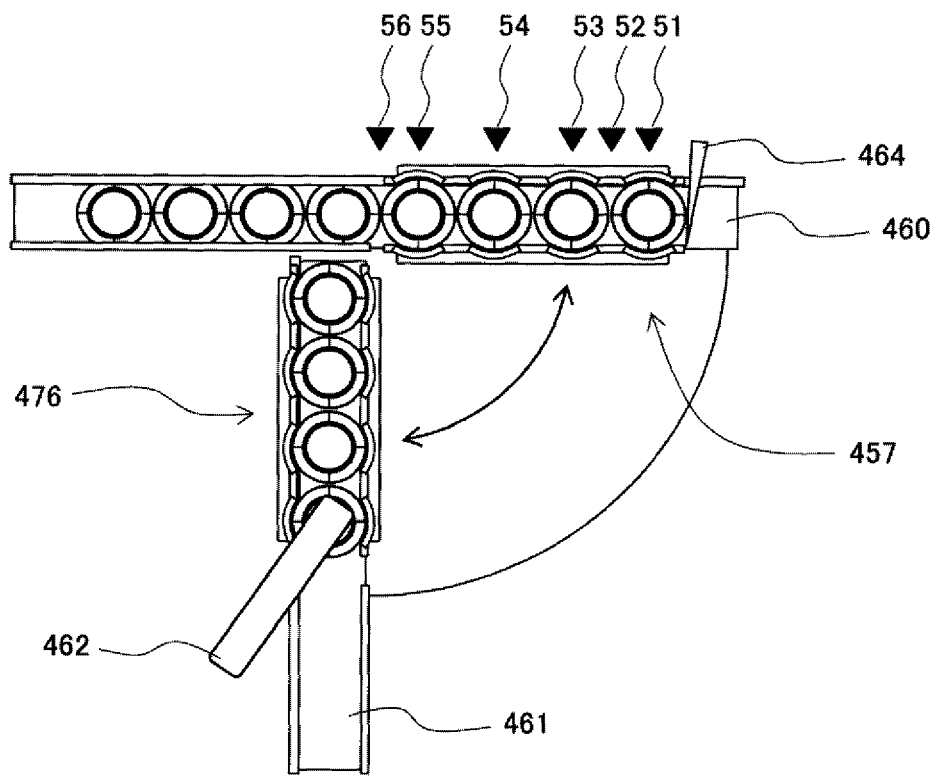
FIG. 50 is a diagram diagrammatically showing the configuration of the transport device in a retracting position of the specimen rack according to a modification of the second embodiment.

FIG. 50 is a diagram diagrammatically showing the configuration of the transport device in a retracting position of the specimen rack. In the figures, the same reference signs are attached to members similar to those in the second embodiment and a description thereof is omitted.

In FIG. 50, a rack stopper 464 that blocks movement of the specimen racks 2, 3, a belt conveyor 461 that transports the specimen racks 2, 3 in a direction different from that of a belt conveyor 460, the retracting transport mechanism 476 that transports the specimen racks 2, 3 from the belt conveyor 460 to the belt conveyor 461, a dispensing probe 462 that dispenses the specimen of the specimen container 1 of the specimen racks 2, 3 on the belt conveyor 461, and the sensors 51 to 56 are arranged in a retracting position 457 of the specimen racks 2, 3 provided on the belt conveyor 460. When transporting the specimen racks 2, 3 from the belt conveyor 460 to the belt conveyor 461 in the retracting position 457, the retracting transport mechanism 476 changes the direction of the specimen racks 2, 3 by matching to the belt conveyor 461 from the belt conveyor 460.

The other configuration is the same as in the second embodiment.

Also in the present modification configured as described above, effects similar to those in the second embodiment can be obtained.

REFERENCE SIGNS LIST

1 Specimen container
2 Specimen rack (first specimen rack)
3 Specimen rack (second specimen rack)
21 Specimen rack loading portion
22 ID reader
23 Transport device
24, 25, 26 Analysis module
27 Specimen rack recovery portion
28 General management computer
30 Display apparatus
57, 377 Transport mechanism
57a, 257a Gripping plate
376A, 376B, 476 Retracting transport mechanism
60, 61, 368, 369 Belt conveyor
62, 362 Dispensing probe
100 Automatic analyzer

The invention claimed is:

1. An automatic analyzer comprising:
a transport device that transports a plurality of types of specimen racks including first specimen racks and second specimen racks on a first transport path, and on which at least one specimen container containing a specimen to be analyzed is mounted;
an analysis unit that includes a detector to analyze the specimen contained in the specimen container; and
a controller programmed to control the transport device,
wherein the transport device includes:
a belt mechanism that transports the specimen racks on the first transport path in a transport direction;
a specimen rack stopper provided on the first transport path to stop and limit movement of the specimen racks to a downstream side of a gripping position on the first transport path;
a plurality of sensors disposed along the first transport path at a plurality of positions on an upstream side of the specimen rack stopper and configured to respectively detect a presence or absence of the specimen racks at each of the positions on the first transport path;
a first specimen rack gripping mechanism configured to move along the first transport path and that includes a pair of first gripping plates which are disposed to extend in the transport direction on both sides of the first transport path, and a first motor which is configured to drive the first gripping plates to move to grip one or more of the specimen racks on the first transport path at the gripping position, and the one or more specimen racks are gripped by the first gripping plates by being sandwiched between the first gripping plates from both sides of the first transport path,
wherein the controller is programmed to:
determine whether the one or more specimen racks stopped by the specimen rack stopper at the gripping position are plural first specimen racks or a single second specimen rack based on detection results from the plurality of sensors,
upon determining that the plural first specimen racks are stopped by the specimen rack stopper at the gripping position, cause the first motor to drive each of the first gripping plates to move transverse to the transport direction to have a first gripping width between the first gripping plates to contact and grip both sides of each of the plural first specimen racks stopped by the specimen rack stopper at the gripping position, and cause the transport mechanism to simultaneously transport the gripped plural first specimen racks, and
upon determining that the single second specimen rack is stopped by the specimen rack stopper at the gripping position, cause the first motor to drive each of the first gripping plates to move transverse to the transport direction to have a second gripping width between the first gripping plates to contact and grip both sides of the single second specimen rack stopped by the specimen rack stopper at the gripping position, and cause the transport mechanism to transport the single second specimen rack, and
wherein the second gripping width is smaller than the first gripping width.

2. The automatic analyzer according to claim 1, wherein the first specimen rack gripping mechanism has a switching structure that includes:
a disk-shaped member that is driven by the first motor to rotate in a horizontal direction using a middle in the transport direction and a width direction of the transport path of the gripping plate as a rotation center,
a pair of sliding protrusions provided on a surface of the disk-shaped member facing the first gripping plates in two positions symmetric with respect to the rotation center of the disk-shaped member,
a pair of longitudinal guides respectively provided on the pair of the first gripping plates which guide the sliding protrusions as the disk-shaped member rotates, and
a transverse guide that guides movement in the width direction of the first gripping plates.

3. The automatic analyzer according to claim 1, wherein a length, in the transport direction, of the first specimen racks is shorter than a length, in the transport direction, of the gripping plates and a width of the first specimen racks is wider than a width of the second specimen racks, and
wherein a length, in the transport direction, of the second specimen racks is substantially equal to the length of the gripping plates and a width of the second specimen racks is narrower than the width of the first specimen racks wherein the controller is programmed to:
  determine whether the one or more specimen racks stopped by the specimen rack stopper at the gripping position are plural first specimen racks, the single second specimen rack, or a mix of plural first specimen racks and the single second specimen rack based on detection results from the plurality of sensors,
  upon determining that the mix of plural first specimen racks and the single second specimen rack are stopped by the specimen rack stopper at the gripping position, cause the motor to drive the two gripping plates to move to have the first gripping width between the two gripping plates of the specimen rack gripping mechanism to grip only the plural first specimen racks stopped by the specimen rack stopper at the gripping position without gripping the single second specimen rack, and cause the transport mechanism to simultaneously transport the gripped plural first specimen racks.

4. The automatic analyzer according to claim 1, wherein the first specimen racks and the second specimen racks are configured to hold different numbers of the specimen containers,
  wherein a length, in the transport direction, of the first specimen racks is shorter than a length, in the transport direction, of the first gripping plates and a width of the first specimen racks is wider than a width of the second specimen racks, and
  wherein a length, in the transport direction, of the second specimen racks is substantially equal to the length of the first gripping plates and a width of the second specimen racks is narrower than the width of the first specimen racks.

5. The automatic analyzer according to claim 4, wherein each of the first specimen racks is configured to hold only one specimen container and each of the second specimen racks is configured to hold a plurality of specimen containers arranged equidistantly in the transport direction.

6. The automatic analyzer according to claim 4, wherein the first specimen racks each have a curved surface shape on both side surfaces gripped by the first gripping plates and the second specimen racks each have a flat surface shape on both side surfaces gripped by the first gripping plates, and
  wherein surfaces opposite to each other of the first gripping plates each include:
    a flat surface portion which corresponds to the flat surface shape of the second specimen racks, and
    a plurality of concave curved surface portions which correspond to the curved surface shape of the first specimen racks and are arranged equidistantly in the transport direction.

7. The automatic analyzer according to claim 4, wherein surfaces opposite to each other of the first gripping plates each include an elastically deformable portion that comes into contact when the first or second specimen racks are gripped.

8. The automatic analyzer according to claim 4, wherein the controller is programmed to:
  cause the transport mechanism to simultaneously transport the gripped plural first specimen racks to a specimen dispensing position and control a moving distance to the specimen dispensing position in accordance with a shape of the first specimen racks, and
  cause the transport mechanism to transport the gripped single second specimen rack to the specimen dispensing position and control a moving distance to the specimen dispensing position in accordance with a shape of the single second specimen rack.

9. The automatic analyzer according to claim 4, further comprising:
  a second transport path arranged along the first transport path,
  wherein the transport device transports the first specimen racks or the second specimen racks in a horizontal direction to move between the first transport path and the second transport path.

10. The automatic analyzer according to claim 4, wherein each of the first specimen racks includes a base portion having a diameter smaller than the first transport path and a specimen container holding portion having a diameter smaller than the base portion and configured to hold only one specimen container,
  wherein each of the second specimen racks includes a specimen container holding portion having a width narrower than a width of the specimen container holding portion of the first specimen racks and a top end of the specimen container holding portion of the second specimen racks is higher than a top end of the specimen container holding portion of the first specimen racks, and
  wherein the transport device further includes:
    a first guide member provided along the first transport path on both sides of the first transport path to guide movement in the transport direction while limiting movement in a width direction of the specimen container holding portion of the first specimen racks; and
    a second guide member provided along the first transport path on both sides of the first transport path above the top end of the specimen container holding portion of the first specimen racks to guide the movement in the transport direction while limiting movement in a width direction of the specimen container holding portion of the second specimen racks.

11. The automatic analyzer according to claim 4, further comprising:
  a third transport path arranged toward a direction different from that of the first transport path,
  wherein the transport device switches the first specimen racks or the second specimen racks between the first transport path and the third transport path by rotating the first specimen racks or the second specimen racks in a horizontal direction.

12. The automatic analyzer according to claim 4, further comprising:
  a second transport path arranged along the first transport path,
  a second specimen rack gripping mechanism disposed above the first specimen rack gripping mechanism, configured to move between the first transport path and the second transport path and that includes a pair of second gripping plates which are disposed to extend in the transport direction on both sides of the first transport path, and a second motor which is configured to drive the two gripping plates to move to grip the specimen racks gripped by the first specimen rack gripping mechanism on the first transport path at a specimen rack retracting position,
  wherein the controller is programmed to:
  cause the first specimen rack gripping mechanism to simultaneously transport the plural first specimen racks gripped by the first gripping plates downstream to the specimen rack retracting position,
  cause the second motor to drive each of the second gripping plates to move transverse to the transport direction to contact and grip both sides of each of the plural first specimen racks gripped by the first gripping plates at the specimen rack retracting position, cause the first motor to drive the first gripping plates to move to release the plural first specimen racks, and cause the second specimen rack gripping mechanism to simultaneously transport the plural first specimen racks gripped by the second gripping plates from the first transport path to the second transport path.

13. The automatic analyzer according to claim 12, wherein surfaces opposite to each other of the second gripping plates each include:

a flat surface portion which corresponds to the flat surface shape of the second specimen racks, and a plurality of concave curved surface portions which correspond to the curved surface shape of the first specimen racks and are arranged equidistantly in the transport direction.

14. The automatic analyzer according to claim 12, wherein the controller is programmed to:

cause the first specimen rack gripping mechanism to transport the single second specimen rack gripped by the first gripping plates downstream to the specimen rack retracting position, cause the second motor to drive each of the second gripping plates to move transverse to the transport direction to contact and grip both sides of the single second specimen rack gripped by the first gripping plates at the specimen rack retracting position, cause the first motor to drive the first gripping plates to move to release the single second specimen rack, and cause the second specimen rack gripping mechanism to transport the single second specimen rack gripped by the second gripping plates from the first transport path to the second transport path.

\* \* \* \* \*